United States Patent
Yamamoto et al.

(10) Patent No.: US 11,089,225 B2
(45) Date of Patent: Aug. 10, 2021

(54) OPTICAL MEASURING DEVICE, IMAGE GENERATING METHOD, AND IMAGE GENERATING PROGRAM

(71) Applicant: KONICA MINOLTA, INC., Chiyoda-ku (JP)

(72) Inventors: Koji Yamamoto, Kawanishi (JP); Satoshi Yokota, Toyonaka (JP); Norimasa Kubota, Sakai (JP); Yoshihisa Abe, Sakai (JP); Yuta Yamanoi, Toyonaka (JP); Masaaki Chigasaki, Toyonaka (JP); Osamu Toyama, Kakogawa (JP)

(73) Assignee: KONICA MINOLTA, INC., Tokyo (JP)

( * ) Notice: Subject to any disclaimer, the term of this patent is extended or adjusted under 35 U.S.C. 154(b) by 16 days.

(21) Appl. No.: 16/091,446

(22) PCT Filed: Apr. 5, 2017

(86) PCT No.: PCT/JP2017/014173
§ 371 (c)(1),
(2) Date: Oct. 4, 2018

(87) PCT Pub. No.: WO2017/175779
PCT Pub. Date: Oct. 12, 2017

(65) Prior Publication Data
US 2019/0158756 A1 May 23, 2019

(30) Foreign Application Priority Data
Apr. 8, 2016 (JP) .............................. JP2016-078150

(51) Int. Cl.
*H04N 5/232* (2006.01)
*G01N 21/27* (2006.01)
(Continued)

(52) U.S. Cl.
CPC ......... *H04N 5/23299* (2018.08); *G01B 11/30* (2013.01); *G01N 21/27* (2013.01);
(Continued)

(58) Field of Classification Search
CPC .... H04N 5/23299; H04N 5/232; G01B 11/30; G01B 11/303; G01N 21/27; G01N 21/55; G03B 5/04; G03B 5/08; G03B 15/00
See application file for complete search history.

(56) References Cited

U.S. PATENT DOCUMENTS 4,998,126 A * 3/1991 Kazami .................. G02B 7/36
396/125
6,906,752 B1 * 6/2005 Harada .................. H04N 5/232
348/208.99

(Continued)

FOREIGN PATENT DOCUMENTS

| JP | 2006-258543 | 9/2006 |
|---|---|---|
| JP | 2013-185862 | 9/2013 |

OTHER PUBLICATIONS

H. Hontani et al., "Vibratory Image Feature Extraction based on Local Log-Polar Symmetry", Transactions of Information Processing Society of Japan, Jul. 2002, vol. 43, No. 7, pp. 2309-2318.
(Continued)

*Primary Examiner* — Michael E Teitelbaum
(74) *Attorney, Agent, or Firm* — Cozen O'Connor

(57) ABSTRACT

An optical measuring device comprises: a lens to form an image with reflected light from a measuring object; an image sensor to receive the reflected light that has passed through the lens and generate an image representing the measuring object; a driver to drive a drive object, the drive object being at least one of the lens and the image sensor; and a controller to control the optical measuring device. The controller acquires, from the image sensor, a plurality of images generated by the image sensor successively imaging the
(Continued)

measuring object while the driver is driving the drive object in accordance with a predetermined driving pattern, and outputs the plurality of images.

20 Claims, 24 Drawing Sheets

(51) Int. Cl.
　　*G03B 5/08* (2021.01)
　　*G03B 15/00* (2021.01)
　　*G03B 5/04* (2021.01)
　　*G01B 11/30* (2006.01)
　　*G01N 21/55* (2014.01)

(52) U.S. Cl.
　　CPC ............... *G03B 5/04* (2013.01); *G03B 5/08* (2013.01); *G03B 15/00* (2013.01); *H04N 5/23212* (2013.01); *G01B 11/303* (2013.01); *G01N 21/55* (2013.01)

(56) References Cited

U.S. PATENT DOCUMENTS

| | | | |
|---|---|---|---|
| 7,068,006 B2* | 6/2006 | Nishimoto | H04N 5/232 318/162 |
| 2008/0055571 A1* | 3/2008 | Makii | G02B 27/646 353/101 |
| 2013/0093941 A1* | 4/2013 | Itoh | H04N 5/347 348/345 |
| 2015/0260647 A1* | 9/2015 | Seto | G01N 21/55 356/445 |
| 2015/0276623 A1* | 10/2015 | Urano | G01N 21/956 356/369 |

OTHER PUBLICATIONS

International Search Report dated Jun. 27, 2017 issued in corresponding Application No. PCT/JP2017/014173.
Written Opinion of the International Searching Authority dated Jun. 27, 2017 issued in corresponding Application No. PCT/JP2017/014173.
Office Action dated Jul. 21, 2020 issued in Japanese Patent Application No. 2018-510627.

* cited by examiner

FIG.7
(A)
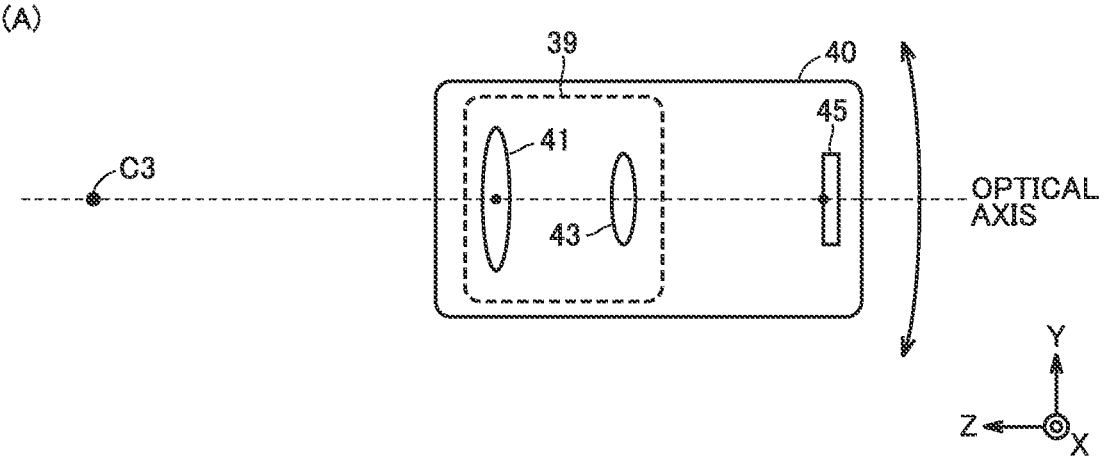
(B)
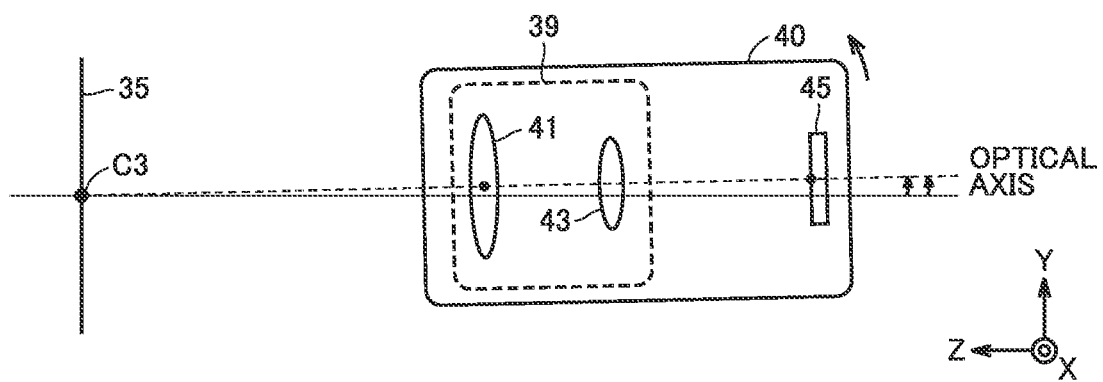

FIG.20

| MATERIAL TYPE | DRIVING PATTERN |
|---|---|
| EXTERIOR OF AUTOMOBILE (METAL, RESIN, CLOTH) | A、B |
| INTERIOR OF AUTOMOBILE (METAL, RESIN, LEATHER, ARTIFICIAL LEATHER, CLOTH, WOOD) | B、C |
| BEVERAGE CAN (METAL, RESIN) | D |
| PRINTED MATTER (FILM, PAPER, WOOD, METAL) | E、F |
| ⋮ | ⋮ |

FIG.21

```
                                                            ,-112
INPUT INFORMATION
  ·DATA NO.                DATA01
  ·DATE AND TIME           2016/01/22 16:35
   OF MEASUREMENT
  ·NAME OF                 LEATHER GRAIN, AUTOMOTIVE COMPONENT (BUMPER),
   MATERIAL DB             BEVERAGE CAN, PRINTED MATTER, etc.
  ·MEASUREMENT             LUMINANCE
   ITEM 1
    NAME OF DRIVING        P01
    PATTERN
    NUMBER OF              M
    DRIVING PATTERNS
    CONTROL DATA           NUMBER OF DRIVING STEPS:m  DRIVING AMOUNT
                           INFORMATION STEP01:(x1,y1,z1,Θ1), STEP02 ···
  ·MEASUREMENT             CHROMATICITY
   ITEM 2
    NAME OF DRIVING        P02
    PATTERN
    NUMBER OF              M
    DRIVING PATTERNS
    CONTROL DATA           NUMBER OF DRIVING STEPS:m  DRIVING AMOUNT
                           INFORMATION STEP01:(x1,y1,z,Θ1), STEP02 ···
  ·MEASUREMENT             GLOSS LEVEL
   ITEM 3
    NAME OF DRIVING        PT03
    PATTERN
    NUMBER OF              M
    DRIVING PATTERNS
    CONTROL DATA           NUMBER OF DRIVING STEPS:m  DRIVING AMOUNT
                           INFORMATION STEP01:(x1,y1,z1,Θ1),
                           STEP02 ···
                           (FOLLOWED BY INFORMATION ON ORANGE PEEL,
                           SHARPNESS, BRILLIANCE, 3D TEXTURE)
  ·MEASURER
  ·MEASURING OBJECT INFORMATION
OUTPUT INFORMATION
  ·OUTPUT IMAGE
  ·RESULTS OF OPTICAL OPERATION:LUMINANCE VALUE, CHROMATICITY,
   GLOSS LEVEL, ORANGE PEEL, SHARPNESS, BRILLIANCE, 3D TEXTURE
  ·RESULTS OF TEXTURE EVALUATION
```

OPTICAL MEASURING DEVICE, IMAGE GENERATING METHOD, AND IMAGE GENERATING PROGRAM

RELATED APPLICATIONS

This is a U.S. National Phase Application under 35 USC 371 of International Application PCT/JP2017/014173 filed on Apr. 5, 2017.

This application claims the priority of Japanese application no. 2016-078150 filed Apr. 8, 2016, the entire content of which is hereby incorporated by reference.

FIELD OF THE INVENTION

The present disclosure relates to the control of an optical measuring device, and particularly to the control of an optical measuring device capable of generating an image.

DESCRIPTION OF THE RELATED ART

An optical measuring device capable of detecting defects in a measuring object has been commonly used. Regarding the technology for detecting defects in a measuring object, Japanese Laid-Open Patent Publication No. 2013-185862 (PTL 1) discloses an inspecting device "capable of high-speed and high-sensitivity detection of defects". This inspecting device performs image processing on images obtained by imaging a measuring object and detects defects in the measuring object.

When a worker visually inspects a measuring object for defects, the worker checks the measuring object from various angles. At this time, the worker examines the measuring object for defects by synthesizing optical information (e.g. a change in reflected light) obtained by visually inspecting the measuring object. With the inspecting device disclosed in PTL 1, a measuring object is imaged from only one point by a fixed imaging unit. Accordingly, the inspecting device cannot obtain such optical information as can be obtained by a human being. Thus, there has been a demand for an optical measuring device capable of imaging a measuring object under various conditions.

CITATION LIST

Patent Literature

PTL 1: Japanese Laid-Open Patent Publication No. 2013-185862

SUMMARY

An optical measuring device comprises: a lens to form an image with reflected light from a measuring object; an image sensor to receive the reflected light that has passed through the lens and generate an image representing the measuring object; a driver to drive a drive object, the drive object being at least one of the lens and the image sensor; and a controller to control the optical measuring device. The controller acquires, from the image sensor, a plurality of the images generated by the image sensor successively imaging the measuring object while the driver is driving the drive object in accordance with a predetermined driving pattern, and outputs the plurality of the images.

According to another aspect, an image generating method with an imaging device is provided. The imaging device comprises: a lens to form an image with reflected light from a measuring object; and an image sensor to receive the reflected light that has passed through the lens and generate an image representing the measuring object. The image generating method comprises: driving a drive object in accordance with a predetermined driving pattern, the drive object being at least one of the lens and the image sensor; causing the image sensor to successively image the measuring object while the drive object is being driven in accordance with the predetermined driving pattern, and acquiring a plurality of the images from the image sensor; and outputting the plurality of the images.

According to still another aspect, an image generating program with an imaging device is provided. The imaging device comprises: a lens to form an image with reflected light from a measuring object; and an image sensor to receive the reflected light that has passed through the lens and generate an image representing the measuring object. The image generating program causes the imaging device to perform: driving a drive object in accordance with a predetermined driving pattern, the drive object being at least one of the lens and the image sensor; causing the image sensor to successively image the measuring object while the drive object is being driven in accordance with the predetermined driving pattern, and acquiring a plurality of the images from the image sensor; and outputting the plurality of the images.

The above and other objects, features, aspects, and advantages of the present disclosure will be apparent from the following detailed description on the present disclosure which will be understood in conjunction with the accompanying drawings.

BRIEF DESCRIPTION OF THE DRAWINGS

FIG. 7 schematically illustrates a driving mode with a second drive system.

FIG. 20 illustrates an example material database.

FIG. 21 illustrates an example data format.

DETAILED DESCRIPTION OF EMBODIMENTS

Embodiments of the present disclosure are described hereinafter with reference to the drawings. In the following description, identical parts and components are identically denoted and have the same names and functions. Therefore, the detailed explanation of such parts and components is not repeated. The embodiments and variations described hereinafter may be combined selectively as appropriate.

First Embodiment

[Outline of Optical Measuring Device 100]

The outline of an optical measuring device 100 according to an embodiment is described. Optical measuring device 100 (imaging device) includes a lens to form an image with reflected light from a measuring object, and an image sensor to receive the reflected light that has passed through the lens and generate an image representing the measuring object. Optical measuring device 100 also includes a driver to drive at least one of the lens and the image sensor (hereinafter also referred to as a "drive object"). Optical measuring device 100 outputs a plurality of images (hereinafter also referred to as "output images") obtained by successively imaging a measuring object while driving at least one of the lens and the image sensor in accordance with a predetermined driving pattern.

Optical measuring device 100 can image a measuring object under various conditions by imaging the measuring object while driving a drive object. This allows optical measuring device 100 to image a measuring object from various directions or while shifting the focal point. Optical measuring device 100 can also measure a change in surface reflectance and a degree of surface roughness of the measuring object, for example.

[Configuration of Optical Measuring Device 100]

Figure 1:
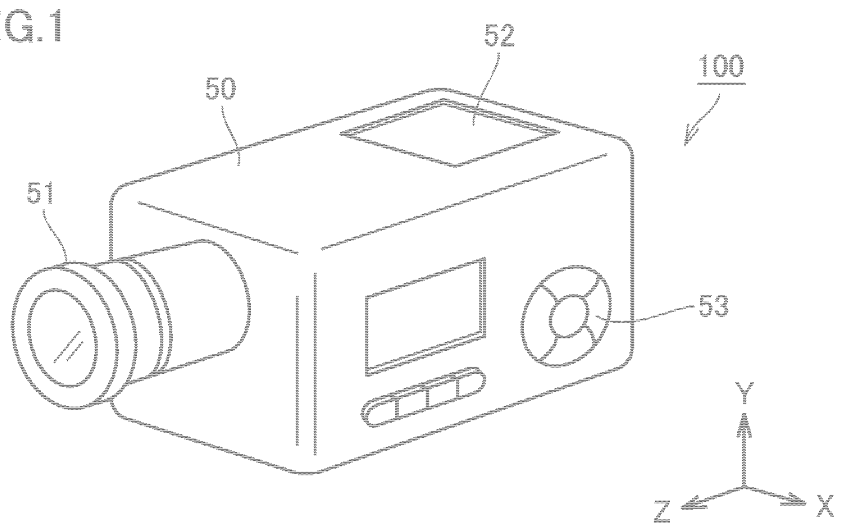
FIG. 1 illustrates an external appearance of an optical measuring device according to a first embodiment.
Figure 2:
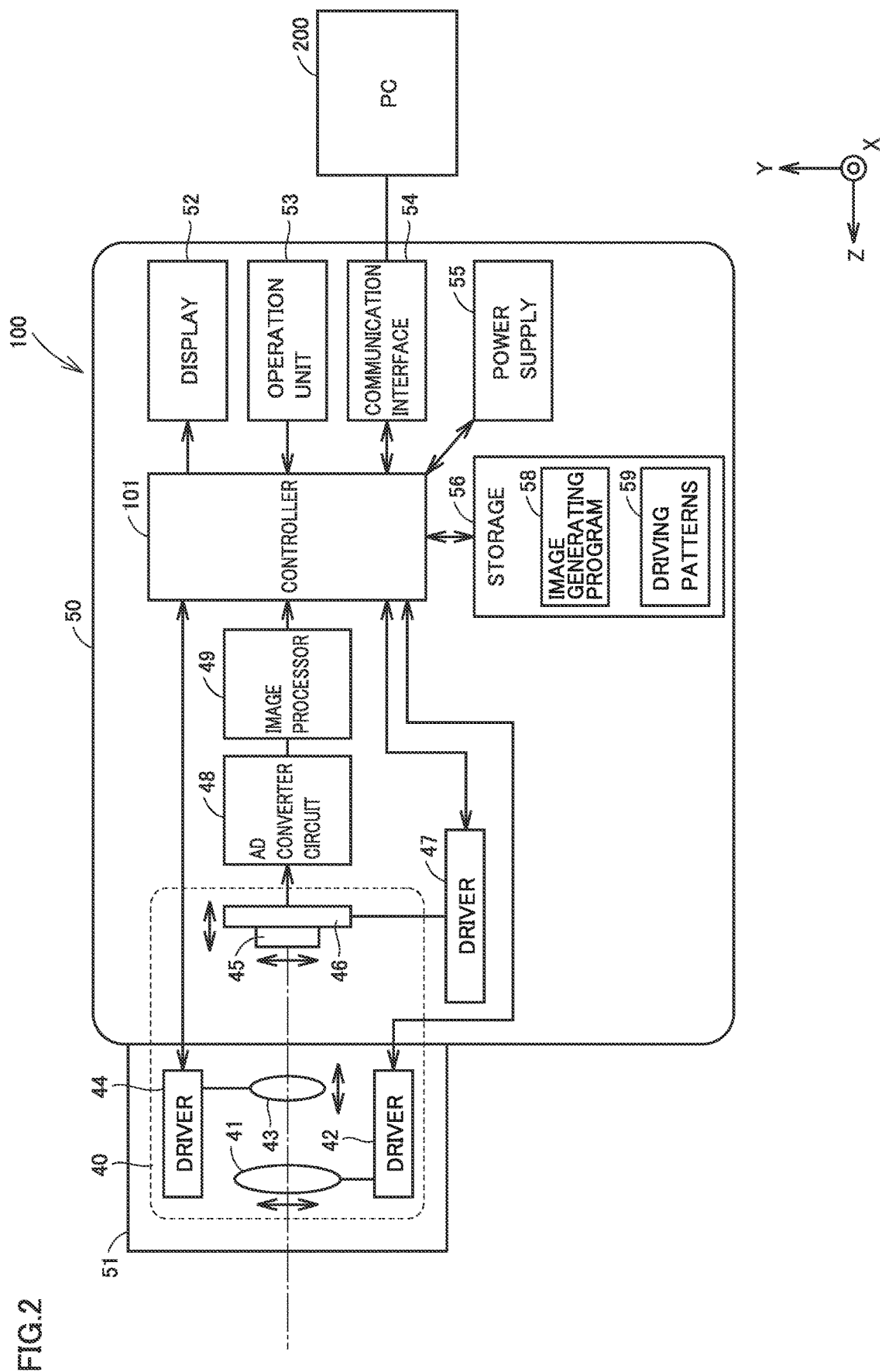
FIG. 2 illustrates an internal configuration of the optical measuring device according to the first embodiment.

With reference to FIG. 1 and FIG. 2, a configuration of optical measuring device 100 according to a first embodiment is described. FIG. 1 illustrates an external appearance of optical measuring device 100. FIG. 2 illustrates an internal configuration of optical measuring device 100.

Hereinafter, the optical-axis direction of optical measuring device 100 is also referred to as the Z direction. The directions orthogonal to the Z direction are also referred to as the X direction and the Y direction. The X direction, the Y direction, and the Z direction are orthogonal to one another.

As shown in FIG. 1 and FIG. 2, optical measuring device 100 comprises a housing 50 and an optical system 51. Housing 50 includes a display 52, an operation unit 53, and a communication interface 54.

Optical measuring device 100 includes thereinside an optical unit 40, a driver 47, an AD (Analog-to-Digital) converter circuit 48, an image processor 49, a power supply 55, a storage 56, and a controller 101. Optical unit 40 includes lenses 41, 43, drivers 42, 44, an image sensor 45, and an actuator 46.

Lens 41 is an objective lens. Lens 41 forms an image on image sensor 45 with reflected light from a measuring object. Driver 42 drives lens 41 on an XY-plane, for example. That is, lens 41 is driven in a direction orthogonal to the optical-axis direction. Preferably, driver 42 reciprocatively drives lens 41 on an XY-plane in accordance with a control signal output from controller 101.

Lens 43 is a focusing lens. Driver 44 drives lens 43 in the Z-axis direction of lens 43, for example. That is, lens 43 is driven in the optical-axis direction. Preferably, driver 44 reciprocatively drives lens 43 in the Z-axis direction in accordance with a control signal output from controller 101.

Image sensor 45 is a two-dimensional image sensor, such as a CCD (Charge Coupled Device) or a C-MOS (Complementary Metal Oxide Semiconductor). Image sensor 45 receives light that has been reflected from a measuring object and has passed through lenses 41, 43, and generates an image representing the measuring object. Specifically, image sensor 45 converts the reflected light that has passed through lenses 41, 43 into an electric signal by photoelectric conversion. The electric signal is output to AD converter circuit 48. AD converter circuit 48 converts the electric signal from image sensor 45 into a digital signal. The digital signal is output to image processor 49. Image processor 49 generates an image representing the measuring object, based on the digital signal from AD converter circuit 48. The generated image may be a color image or may be a monochrome image.

Image sensor 45 is driven by actuator 46. Driver 47 drives actuator 46 on an XY-plane. Preferably, driver 47 drives actuator 46 in accordance with a control signal output from controller 101 to reciprocatively drive image sensor 45 on an XY-plane. Driver 47 may drive image sensor 45 additionally in the Z direction. In this case, optical measuring device 100 includes an additional actuator for driving image sensor 45 in the Z direction.

Display 52 is for example, an LCD (Liquid Crystal Display), an organic EL (Electroluminescence) display, or another display. Display 52 displays an image generated by image processor 49, in real time. That is, display 52 serves as a finder. Display 52 displays the results of measurement of an object and a setting screen of optical measuring device 100, for example. The setting screen receives input of setting values for optical measuring device 100. Preferably, display 52 comprises a display and a touch panel. The display and the touch panel are placed one above the other, and display 52 receives an operation on optical measuring device 100 through a touch.

Communication interface 54 permits communication between optical measuring device 100 and an external device. The external device is another communication terminal device, such as a PC (Personal Computer) 200. In one aspect, an antenna (not shown) is connected to communication interface 54, so that optical measuring device 100 and PC 200 can communicate with each other by wireless communication via the antenna. Examples of the wireless communication standards used here include Wi-Fi Direct, Bluetooth (registered trademark), and ZigBee. In another aspect, communication interface 54 is a USB port to which a USB cable is connected. The USB cable connects optical measuring device 100 and PC 200 to each other, so that optical measuring device 100 and PC 200 can communicate with each other by wired communication via the USB cable.

Optical measuring device 100 may be configured to download an image generating program 58 according to the present embodiment via communication interface 54. The images and the measurement results generated in optical measuring device 100 are sent to PC 200 via communication interface 54. PC 200 displays the images and the measurement results received from optical measuring device 100.

Operation unit 53 receives an operation on optical measuring device 100. By way of example, operation unit 53 comprises a power supply button, a measurement start button, a select button for a measurement mode, and a setting button (e.g. a cross-shaped button and up and down keys). When the power supply button is turned on, power supply 55 supplies power to each component (e.g. drivers 42, 44, 47 and controller 101) of optical measuring device 100.

Storage 56 is a storage medium, such as a ROM (Read Only Memory), a RAM (Random Access Memory), or a hard disk. Storage 56 stores image generating program 58 of optical measuring device 100, and driving patterns 59 for drive objects of optical measuring device 100, for example. Driving patterns 59 are control data for controlling drivers 42, 44, 47. Driving patterns 59 will be described in detail later.

Controller 101 controls optical measuring device 100. Controller 101 comprises at least one integrated circuit, for example. The integrated circuit comprises, for example, at least one CPU (Central Processing Unit), at least one ASIC (Application Specific Integrated Circuit), at least one FPGA (Field Programmable Gate Array), or a combination of these.

[Driving Patterns 59]

As described above, optical measuring device 100 images a measuring object while driving a drive object, the drive object being at least one of lenses 41, 43 (see FIG. 2) and image sensor 45 (see FIG. 2). In order to obtain such optical information as can be obtained by a human being, the drive object is driven preferably in a manner imitating a human eyeball movement. Thus, optical measuring device 100 drives the drive object in accordance with driving patterns 59 (see FIG. 2) imitating a human eyeball movement.

Figure 3:
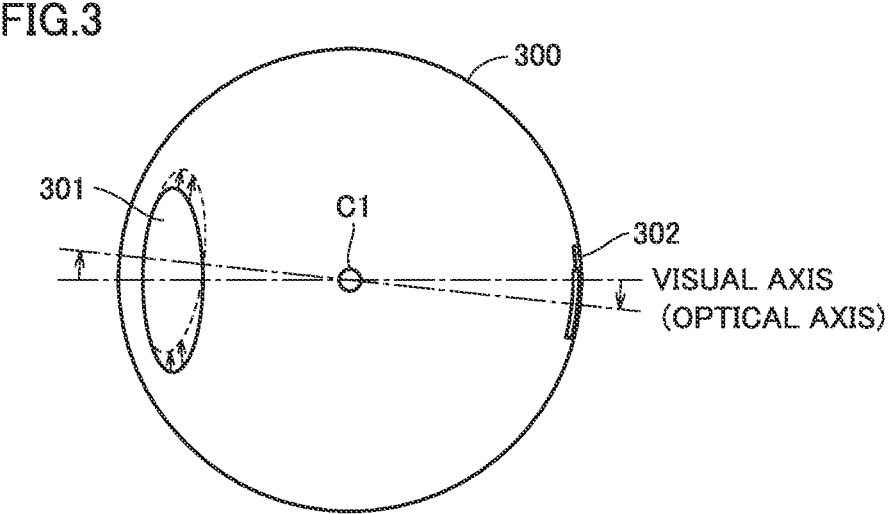
FIG. 3 illustrates a human eyeball.

A human eyeball movement is described with reference to FIG. 3. FIG. 3 illustrates a human eyeball 300.

Eyeball 300 includes a crystalline lens 301 and a retina 302. Crystalline lens 301 corresponds to the above-described lenses 41, 43. Retina 302 corresponds to the above-described image sensor 45.

When a human being views a motionless object, eyeball 300 minutely vibrates. Such a movement of eyeball 300 is called an involuntary eye movement during fixation. When eyeball 300 makes an involuntary eye movement during fixation around a point C1, crystalline lens 301 and retina 302 move. Specifically, when a person raises his/her gaze, crystalline lens 301 moves upward and retina 302 moves downward. When a person lowers his/her gaze, crystalline lens 301 moves downward and retina 302 moves upward. Eyeball 300 repeats such an involuntary eye movement during fixation.

The involuntary eye movement during fixation includes the movements called a tremor, a drift, and a flick. The tremor is a short-cycle movement with a low amplitude. The drift is a long-cycle movement with a high amplitude. The flick is a large movement in a short time.

Figure 4:
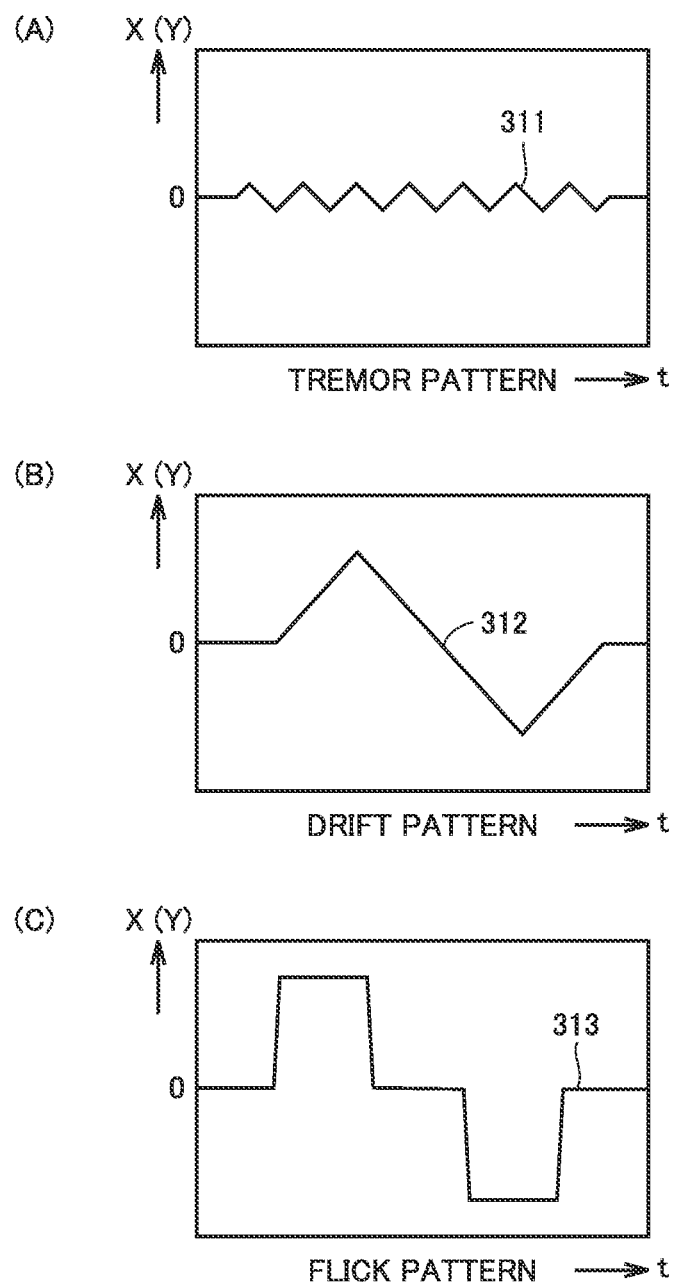
FIG. 4 illustrates a tremor pattern, a drift pattern, and a flick pattern.

Driving patterns 59 for drive objects include a tremor pattern (first driving pattern) imitating the tremor, a drift pattern (second driving pattern) imitating the drift, and a flick pattern (third driving pattern) imitating the flick. FIG. 4 illustrates the tremor pattern, the drift pattern, and the flick pattern.

FIG. 4 (A) illustrates a graph 311. Graph 311 shows the temporal change in position of a drive object that is being driven with the tremor pattern. Specifically, the horizontal axis of graph 311 shows the time. The vertical axis of graph 311 shows the position of the drive object in the X direction or the Y direction.

FIG. 4 (B) illustrates a graph 312. Graph 312 shows the temporal change in position of a drive object that is being driven with the drift pattern. Specifically, the horizontal axis of graph 312 shows the time. The vertical axis of graph 312 shows the position of the drive object in the X direction or the Y direction.

FIG. 4 (C) illustrates a graph 313. Graph 313 shows the temporal change in position of a drive object that is being driven with the flick pattern. Specifically, the horizontal axis of graph 313 shows the time. The vertical axis of graph 313 shows the position of the drive object in the X direction or the Y direction.

The tremor pattern shows a short-cycle movement with a low amplitude. The drift pattern shows a long-cycle movement with a high amplitude. The flick pattern shows a large movement in a short time. In other words, the cycle of driving of the drive object with the tremor pattern is shorter than that with the drift pattern. The amplitude of driving of the drive object with the tremor pattern is lower than that with the drift pattern. The amplitude of driving of the drive object with the tremor pattern is lower than that with the flick pattern. The maximum value of the moving speed of the drive object per unit time with the tremor pattern is lower than that with the flick pattern. The moving speed represents the amount of movement of the drive object per unit time.

Optical measuring device 100 drives a drive object (i.e., at least one of lenses 41, 43 and image sensor 45) in accordance with a predetermined driving pattern, i.e., any of the tremor pattern, the drift pattern, and the flick pattern. In a certain aspect, lens 41 (see FIG. 2) is a drive object. In this case, driver 42 (see FIG. 2) drives lens 41 in accordance with a predetermined driving pattern. Controller 101 (see FIG. 2) of optical measuring device 100 acquires, from image sensor 45 (see FIG. 2), a plurality of images generated by image sensor 45 successively imaging a measuring object while driver 42 is driving lens 41 in accordance with a predetermined driving pattern. Controller 101 then outputs the plurality of images. Preferably, controller 101 successively images the measuring object while lens 41 is being reciprocatively driven.

In another aspect, lens 43 (see FIG. 2) is a drive object. In this case, driver 44 (see FIG. 2) drives lens 43 in accordance with a predetermined driving pattern. Controller 101 (see FIG. 2) of optical measuring device 100 acquires, from image sensor 45, a plurality of images generated by image sensor 45 successively imaging a measuring object while driver 44 is driving lens 43 in accordance with a predetermined driving pattern. Controller 101 then outputs the plurality of images. Preferably, controller 101 successively images the measuring object while lens 43 is being reciprocatively driven.

In still another aspect, image sensor 45 is a drive object. In this case, driver 47 (see FIG. 2) drives image sensor 45 in accordance with a predetermined driving pattern. Controller 101 (see FIG. 2) of optical measuring device 100 acquires, from image sensor 45, a plurality of images generated by image sensor 45 successively imaging a measuring object while driver 47 is driving image sensor 45 in accordance with a predetermined driving pattern. Controller 101 then outputs the plurality of images. Preferably, controller 101 successively images the measuring object while image sensor 45 is being reciprocatively driven.

The imaging of the measuring object may be performed at regular intervals (constant cycle) or at different intervals while the drive object is being reciprocatively driven. The imaging of the measuring object may be performed only when the drive object is going to a target position, or may be performed only when the drive object is returning to the home position, or may be performed both.

Any number of driving patterns can be used for imaging. In one aspect, optical measuring device 100 drives a drive object with one driving pattern. In another aspect, optical measuring device 100 drives a drive object in accordance with two or more different driving patterns sequentially. In this case, candidate driving patterns are stored in the above-described storage 56 (see FIG. 2). Optical measuring device 100 selects two or more driving patterns from among a plurality of candidate driving patterns. Optical measuring device 100 drives a drive object in accordance with the two or more selected driving patterns sequentially. While the drive object is being driven with each driving pattern, optical measuring device 100 images a measuring object and generates a plurality of output images. This allows a wider range of conditions under which optical measuring device 100 can image a measuring object.

Figure 5:
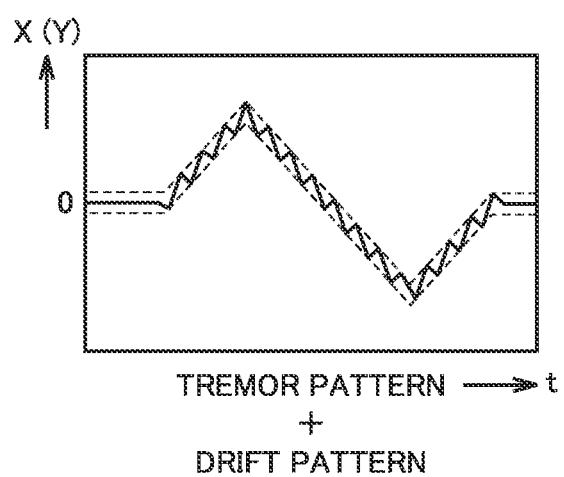
FIG. 5 illustrates a driving pattern obtained by combining the tremor pattern and the drift pattern.

At least two of the tremor pattern, the drift pattern, and the flick pattern may be combined. FIG. 5 illustrates a driving pattern obtained by combining the tremor pattern and the drift pattern. Combining driving patterns increases the types of driving patterns, thus allowing an even wider range of conditions under which optical measuring device 100 can image a measuring object.

[Drive System]

Various drive systems may be employed as a drive system for a drive object. Hereinafter, with reference to FIG. 6 to FIG. 17, first to tenth drive systems are described as example drive systems.

Optical measuring device 100 can use any driving pattern among the above-described tremor pattern, drift pattern, and flick pattern for the first to tenth drive systems described below. The driving pattern may be predetermined or may be set by a user.

(First Drive System)

Figure 6:
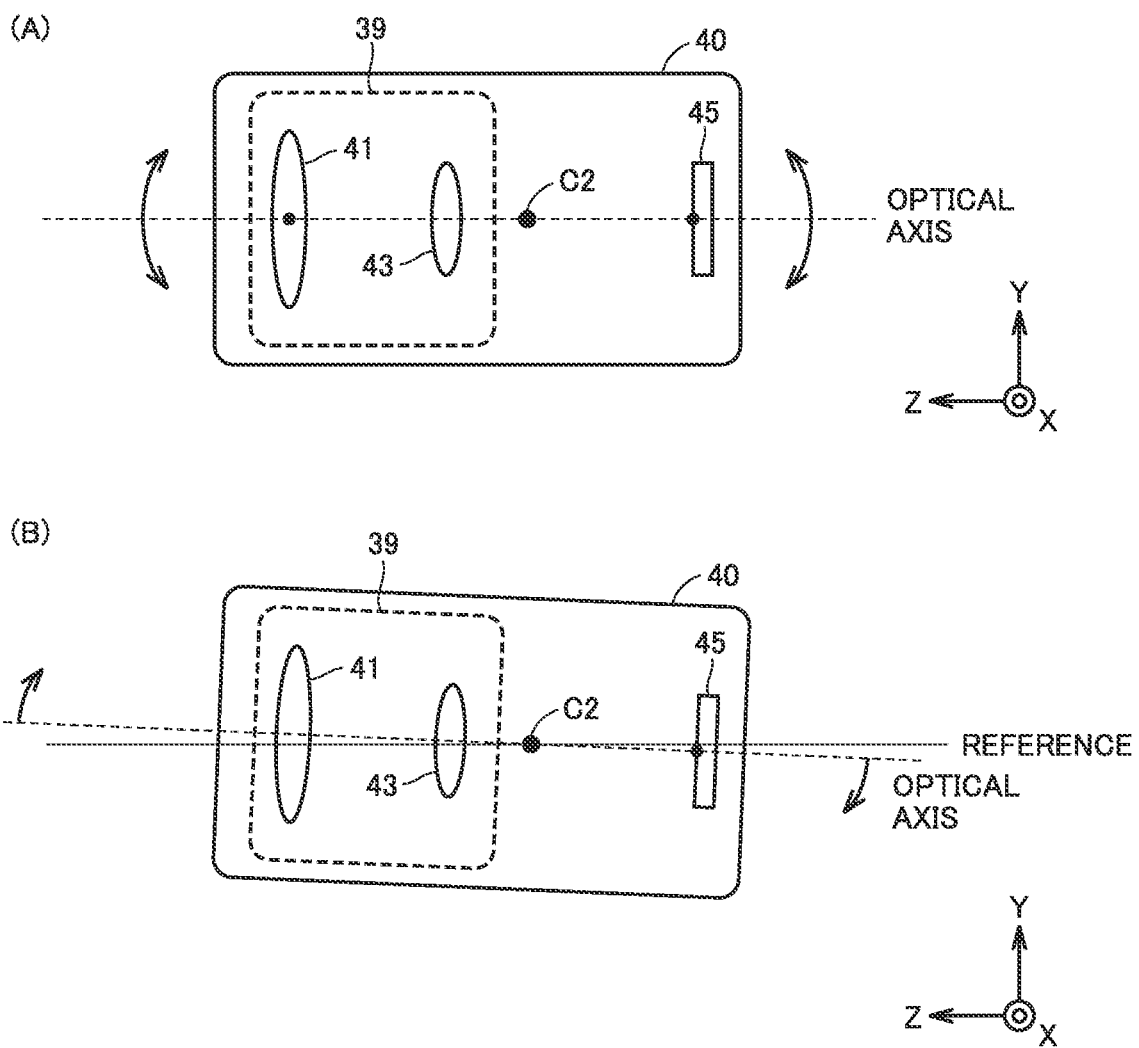
FIG. 6 schematically illustrates a driving mode with a first drive system.

With reference to FIG. 6, the first drive system is described. FIG. 6 schematically illustrates a driving mode with the first drive system.

As shown in FIG. 6 (A) and FIG. 6 (B), in the first drive system, optical measuring device 100 rotates the entire optical unit 40 around a point C2 on the optical axis that lies in optical unit 40. Optical measuring device 100 thus rotationally drives lenses 41, 43 and image sensor 45 around point C2 on the optical axis of lenses 41, 43. Preferably, optical measuring device 100 repeats clockwise and counterclockwise rotations of optical unit 40. As a result, optical measuring device 100 can reciprocatively drive lenses 41, 43 and image sensor 45.

Various rotating mechanisms may be employed as a driving mechanism for rotating optical unit 40. By way of example, optical unit 40 may be rotated by a cam rotating in contact with optical unit 40. The rotation of the cam drives optical unit 40 interlocked with the cam.

While rotationally driving optical unit 40 around point C2, optical measuring device 100 successively images a measuring object. Thus, optical measuring device 100 can image the measuring object from various directions. Based on the output images obtained by imaging the measuring object from various directions, optical measuring device 100 can measure a change in surface reflectance and a degree of surface roughness of the measuring object, for example.

Although FIG. 6 shows a case in which optical unit 40 is rotationally driven on a YZ-plane, optical unit 40 may be rotationally driven on another plane, or may be rotationally driven three-dimensionally.

(Second Drive System)

With reference to FIG. 7, a second drive system is described. FIG. 7 schematically illustrates a driving mode with the second drive system.

In the above-described first drive system, the center of rotation lies in optical unit 40. Unlike this, in the second drive system, the center of rotation lies outside optical unit 40. In the other respects, the second drive system is the same as the first drive system, and thus the explanation of the same features is not repeated hereinafter.

As shown in FIG. 7 (A) and FIG. 7 (B), in the second drive system, optical measuring device 100 rotates the entire optical unit 40 around a point C3 on the optical axis that lies outside optical unit 40. Optical measuring device 100 thus rotationally drives lenses 41, 43 and image sensor 45 around point C3 on the optical axis of lenses 41, 43. Preferably, point C3 is on a surface of a measuring object 35.

While rotationally driving optical unit 40 around point C3, optical measuring device 100 successively images measuring object 35. Thus, optical measuring device 100 can image measuring object 35 from various directions. Based on the output images obtained by imaging the measuring object from various directions, optical measuring device 100 can measure a change in surface reflectance and a degree of surface roughness of the measuring object, for example. Since point C3 on the measuring object is the center of rotation, the positions of the measuring object do not vary among the output images. This allows easy position adjustment of the measuring object among the output images.

Although FIG. 7 shows a case in which optical unit 40 is rotationally driven on a YZ-plane, optical unit 40 may be rotationally driven on another plane, or may be rotationally driven three-dimensionally.

(Third Drive System)

Figure 8:
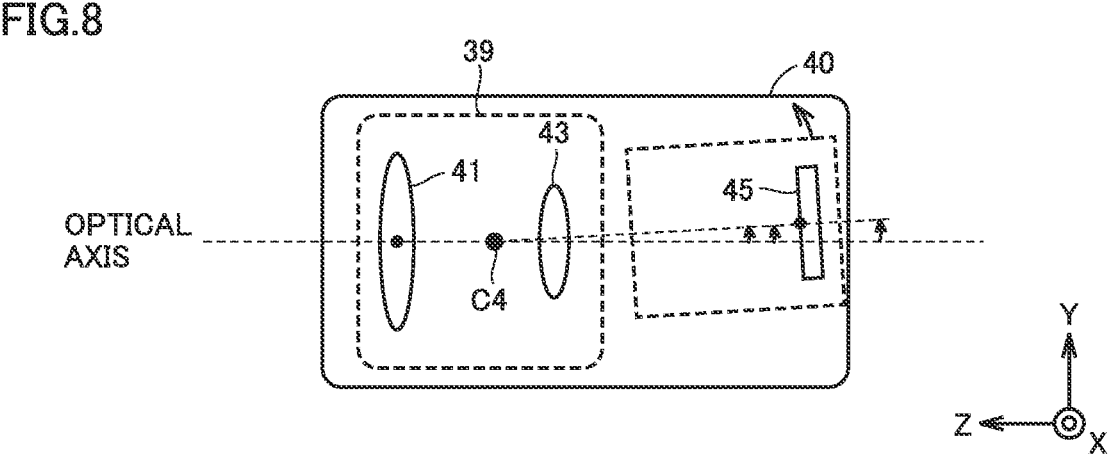
FIG. 8 schematically illustrates a driving mode with a third drive system.

With reference to FIG. 8, a third drive system is described. FIG. 8 schematically illustrates a driving mode with the third drive system.

In the above-described first and second drive systems, all of lenses 41, 43 and image sensor 45 are rotationally driven. Unlike this, in third drive system, at least one of lenses 41, 43 and image sensor 45 is rotationally driven. In the other respects, the third drive system is the same as the first and second drive systems, and thus the explanation of the same features is not repeated hereinafter. The following describes a case in which image sensor 45 is rotationally driven.

In third drive system, optical measuring device 100 rotates image sensor 45 around a point C4 on the optical axis that lies in optical unit 40. At this time, lenses 41, 43 are not driven. Thus, the positional relationship between lenses 41, 43 and image sensor 45 changes. Preferably, optical measuring device 100 repeats clockwise and counterclockwise rotations of image sensor 45. Optical measuring device 100 can thus reciprocatively drive image sensor 45. While rotationally driving image sensor 45 around point C4, optical measuring device 100 successively images a measuring object.

Although FIG. 8 shows a case in which image sensor 45 is rotationally driven on a YZ-plane, image sensor 45 may be rotationally driven on another plane, or may be rotationally driven three-dimensionally.

(Fourth Drive System)

Figure 9:
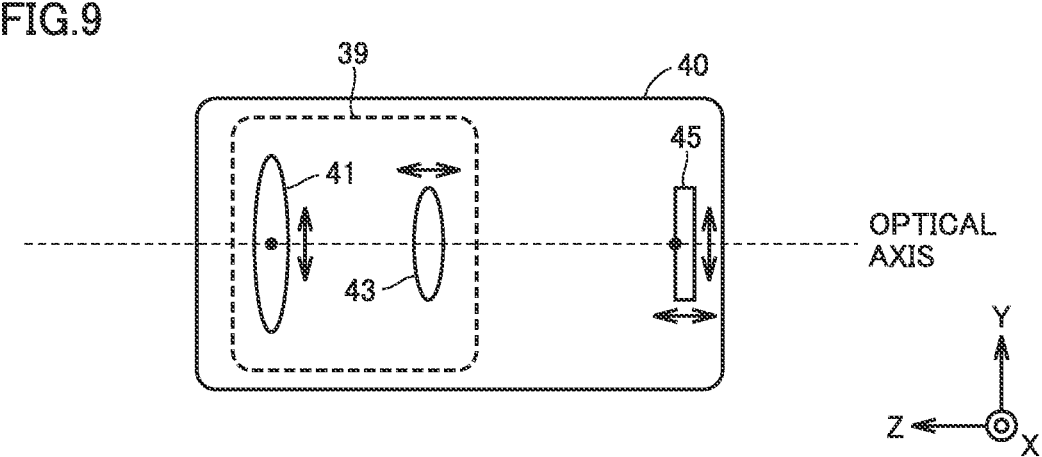
FIG. 9 schematically illustrates a driving mode with a fourth drive system.

With reference to FIG. 9, a fourth drive system is described. FIG. 9 schematically illustrates a driving mode with the fourth drive system.

In the above-described first to third drive systems, a drive object is rotationally driven. Unlike this, in the fourth drive system, a drive object is translated. In the other respects, the fourth drive system is the same as the first to third drive systems, and thus the explanation of the same features is not repeated hereinafter.

In the fourth drive system, optical measuring device 100 individually drives lenses 41, 43 and image sensor 45. Specifically, optical measuring device 100 drives a drive object (i.e., at least one of lenses 41, 43 and image sensor 45) in a direction orthogonal to the optical axis of lenses 41, 43. By way of example, lens 41 is reciprocatively driven in the Y direction. Lens 43 is reciprocatively driven in the optical-axis direction (i.e., the Z direction). This changes the focal point, thus changing the depth of field. Image sensor 45 is reciprocatively driven in the X direction or the Y direction. While reciprocatively driving a drive object (i.e., at least one of lenses 41, 43 and image sensor 45), optical measuring device 100 successively images a measuring object.

Although FIG. 9 shows a case in which lens 41 is reciprocatively driven in the Y direction, lens 41 may be reciprocatively driven in another direction. Similarly, although FIG. 9 shows a case in which lens 43 is reciprocatively driven in the Z direction, lens 43 may be reciprocatively driven in another direction. Similarly, although FIG. 9 shows a case in which image sensor 45 is reciprocatively driven in the Y and Z directions, image sensor 45 may be reciprocatively driven in another direction.

(Fifth Drive System)

Figure 10:
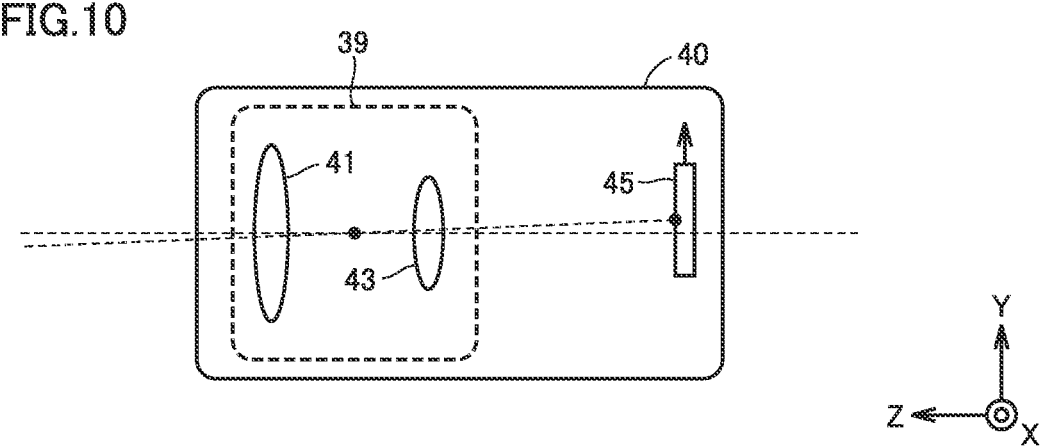
FIG. 10 schematically illustrates a driving mode with a fifth drive system.

With reference to FIG. 10, a fifth drive system is described. FIG. 10 schematically illustrates a driving mode with the fifth drive system.

In the above-described fourth drive system, lenses 41, 43 and image sensor 45 are individually translated. Unlike this, in the fifth drive system, only image sensor 45 is translated. In the other respects, the fifth drive system is the same as the fourth drive system, and thus the explanation of the same features is not repeated hereinafter.

In the fifth drive system, optical measuring device 100 reciprocatively moves image sensor 45 in a direction orthogonal to the optical axis. By way of example, image sensor 45 is driven by a "two-tiered method". In this case, actuator 46 (see FIG. 2) for image sensor 45 comprises a first flat plate for holding image sensor 45, and a second flat plate for holding the first flat plate. The first flat plate drives image sensor 45 in the X direction by, for example, the SIDM (Smooth Impact Drive Mechanism). The second flat plate drives the first flat plate in the Y direction by, for example, the SIDM to drive image sensor 45 in the Y direction. The first flat plate and second flat plate, individually driven, can drive image sensor 45 in any direction on an XY-plane. While reciprocatively driving image sensor 45 in a predetermined direction on an XY-plane, optical measuring device 100 successively images a measuring object.

Although FIG. 10 shows a case in which image sensor 45 is reciprocatively driven in the Y direction, image sensor 45 may be reciprocatively driven in another direction.

(Sixth Drive System)

Figure 11:
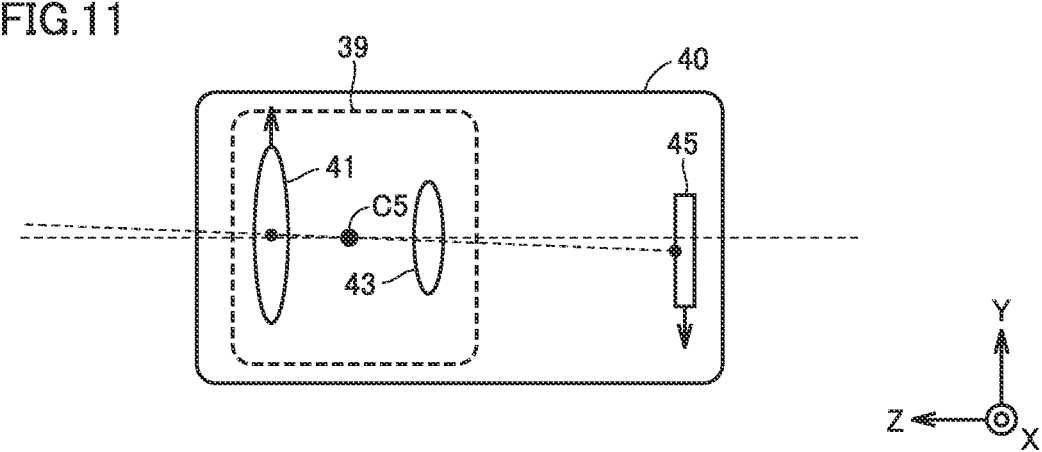
FIG. 11 schematically illustrates a driving mode with a sixth drive system.

With reference to FIG. 11, a sixth drive system is described. FIG. 11 schematically illustrates a driving mode with the sixth drive system.

In the above-described fourth and fifth drive systems, lenses 41, 43 and image sensor 45 move not in a ganged fashion. Unlike this, in the sixth drive system, lenses 41, 43 and image sensor 45 are driven in a ganged fashion. In the other respects, the sixth drive system is the same as the fourth and fifth drive systems, and thus the explanation of the same features is not repeated hereinafter.

The following describes a case in which lens 41 and image sensor 45 are driven from among lenses 41, 43 and image sensor 45. However, lens 43 may additionally be driven.

As shown in FIG. 11, optical measuring device 100 drives lens 41 and image sensor 45 in opposite directions. Lens 41 is driven by driver 42 (see FIG. 2). Image sensor 45 is driven by driver 47 (see FIG. 2). While reciprocatively driving lens 41 and image sensor 45 in opposite directions, optical measuring device 100 successively images a measuring object.

Preferably, optical measuring device 100 makes the driving amount smaller for a drive object located closer to a reference point C5 on the optical axis. By way of example, as shown in FIG. 11, optical measuring device 100 makes the driving amount smaller for lens 41, which is located closer to reference point C5, than for image sensor 45. More preferably, the driving amount of a drive object is proportional to the distance from reference point C5 to the drive object.

Although FIG. 11 shows a case in which lens 41 and image sensor 45 move in a ganged fashion in opposite directions in the Y direction, lens 41 and image sensor 45 may be configured to move in a ganged fashion in opposite directions in another direction.

(Seventh Drive System)

Figure 12:
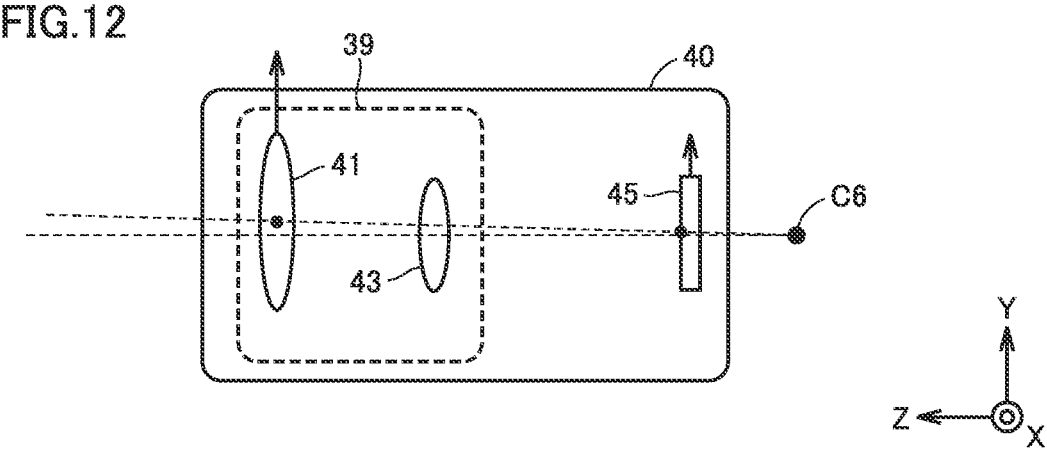
FIG. 12 schematically illustrates a driving mode with a seventh drive system.

With reference to FIG. 12, a seventh drive system is described. FIG. 12 schematically illustrates a driving mode with the seventh drive system.

In the above-described sixth drive system, lens 41 and image sensor 45 are driven in opposite directions. Unlike this, in the seventh drive system, lens 41 and image sensor 45 are driven in the same direction. In the other respects, the seventh drive system is the same as the sixth drive system, and thus the explanation of the same features is not repeated hereinafter.

Optical measuring device 100 drives lens 41 and image sensor 45 in the same direction. Lens 41 is driven by driver 42 (see FIG. 2). Image sensor 45 is driven by driver 47 (see FIG. 2). While reciprocatively driving lens 41 and image sensor 45 in the same direction, optical measuring device 100 successively images a measuring object.

Preferably, optical measuring device 100 makes the driving amount per unit time smaller for a drive object located closer to a reference point C6 on the optical axis. By way of example, as shown in FIG. 12, optical measuring device 100 makes the driving amount smaller for image sensor 45, which is located closer to reference point C6, than for lens 41. More preferably, the driving amount of a drive object is proportional to the distance from reference point C6 to the drive object.

Although FIG. 12 shows a case in which lens 41 and image sensor 45 move in a ganged fashion in the same direction in the Y direction, lens 41 and image sensor 45 may be configured to move in a ganged fashion in the same direction in another direction.

(Eighth Drive System)

Figure 13:
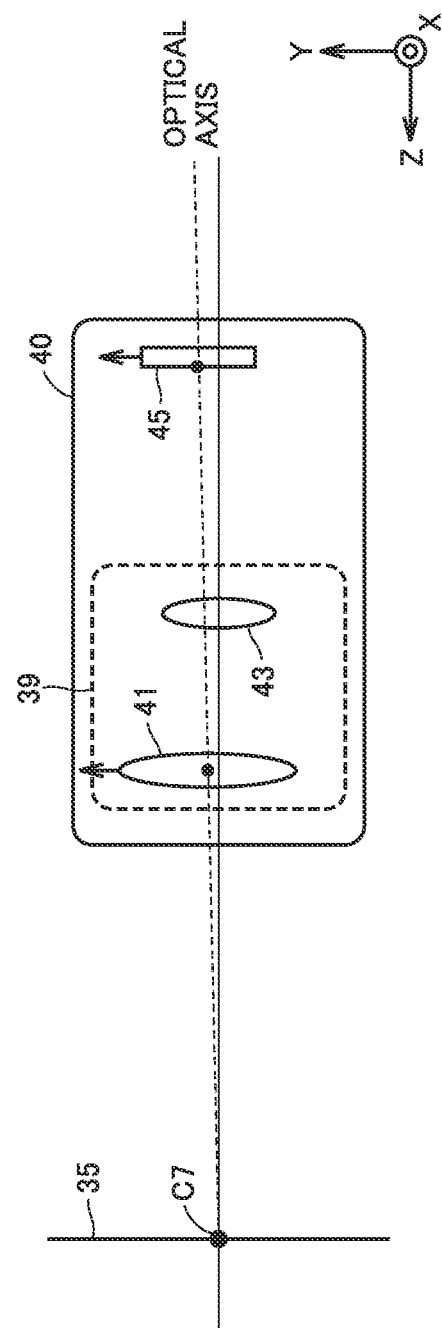
FIG. 13 schematically illustrates a driving mode with an eighth drive system.

With reference to FIG. 13, an eighth drive system is described. FIG. 13 schematically illustrates a driving mode with the eighth drive system.

In the above-described seventh drive system, reference point C6 for driving is closer to image sensor 45 than to lens 41. Unlike this, in the eighth drive system, a reference point C7 for driving is closer to lens 41 than to image sensor 45. In the other respects, the eighth drive system is the same as the seventh drive system, and thus the explanation of the same features is not repeated hereinafter.

As shown in FIG. 13, optical measuring device 100 drives lens 41 and image sensor 45 in the same direction. Lens 41 is driven by driver 42 (see FIG. 2). Image sensor 45 is driven by driver 47 (see FIG. 2). While reciprocatively driving lens 41 and image sensor 45 in the same direction, optical measuring device 100 successively images a measuring object.

At this time, optical measuring device 100 drives lens 41 and image sensor 45 with respect to reference point C7. Reference point C7 lies on the optical axis of lenses 41, 43 and on a measuring object. Optical measuring device 100 makes the driving amount smaller for a drive object located closer to reference point C7 on the optical axis. By way of example, as shown in FIG. 13, optical measuring device 100 makes the driving amount smaller for lens 41, which is located closer to reference point C7, than for image sensor 45. More preferably, the driving amount of a drive object is proportional to the distance from reference point C7 to the drive object.

Although FIG. 13 shows a case in which lens 41 and image sensor 45 move in a ganged fashion in the same direction in the Y direction, lens 41 and image sensor 45 may be configured to move in a ganged fashion in the same direction in another direction.

(Ninth Drive System)

Figure 14:
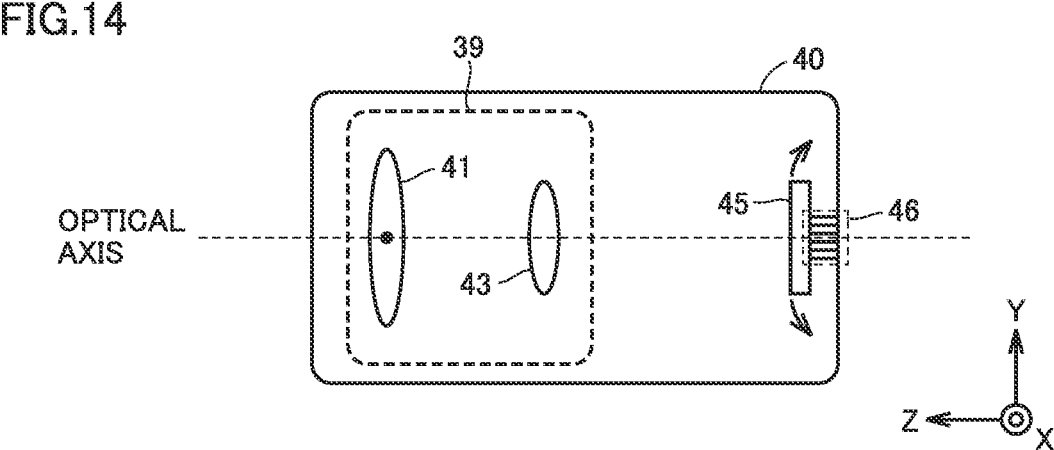
FIG. 14 schematically illustrates a driving mode with a ninth drive system.
Figure 15:
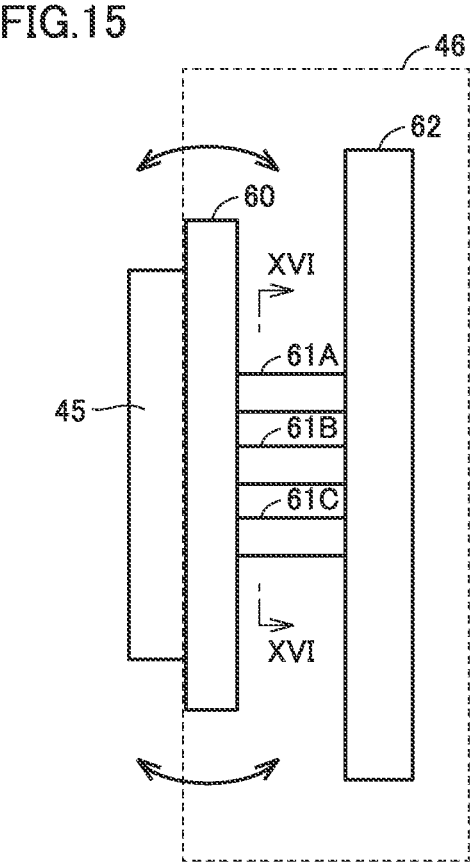
FIG. 15 illustrates an example structure of an actuator 46.
Figure 16:
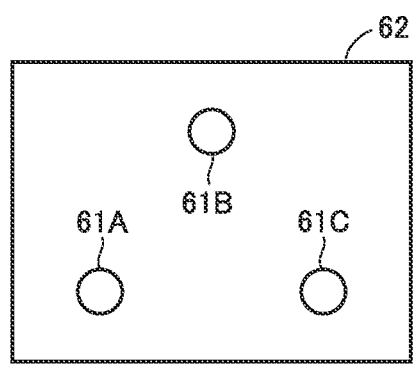
FIG. 16 is a cross-sectional view taken along the line XVI-XVI in FIG. 15.

With reference to FIG. 14 to FIG. 16, a ninth drive system is described. In the above-described drive systems, image sensor 45 is driven to rotate or translate. Unlike this, in the ninth drive system, image sensor 45 is driven to swing. In the other respects, the ninth drive system is the same as the above-described drive systems, and thus the explanation of the same features is not repeated hereinafter.

FIG. 14 schematically illustrates a driving mode with the ninth drive system. Image sensor 45 is driven by actuator 46. Actuator 46 drives image sensor 45 so that the light receiving surface of image sensor 45 inclines relative to the optical axis of lenses 41, 43. Preferably, actuator 46 swings image sensor 45. While swinging image sensor 45, optical measuring device 100 successively images a measuring object.

FIG. 15 illustrates an example structure of actuator 46. FIG. 16 is a cross-sectional view taken along the line XVI-XVI in FIG. 15. As shown in FIG. 15 and FIG. 16, actuator 46 comprises a board 60 holding image sensor 45, piezoelectric elements 61A to 61C, and a base member 62.

Board 60 has one face with image sensor 45 disposed thereon. Board 60 has the other face to which one end of piezoelectric element 61A, one end of piezoelectric element 61B, and one end of piezoelectric element 61C are connected. The other end of piezoelectric element 61A, the other end of piezoelectric element 61B, and the other end of piezoelectric element 61C are connected to base member 62. Each of piezoelectric elements 61A to 61C expands and contracts upon receiving a voltage. Driver 47 (see FIG. 2) in optical measuring device 100 individually controls piezoelectric elements 61A to 61C to individually expand and contract piezoelectric elements 61A to 61C, thereby swinging the light receiving surface of image sensor 45. Providing at least three piezoelectric elements 61A to 61C allows image sensor 45 to swing in any direction.

Although FIG. 15 and FIG. 16 describe a case in which three piezoelectric elements 61A to 61C are provided, the number of piezoelectric elements is not limited to three. Any number of piezoelectric elements that is two or more may be provided. If the number of piezoelectric elements is two, image sensor 45 swings in one direction.

(Tenth Drive System)

Figure 17:
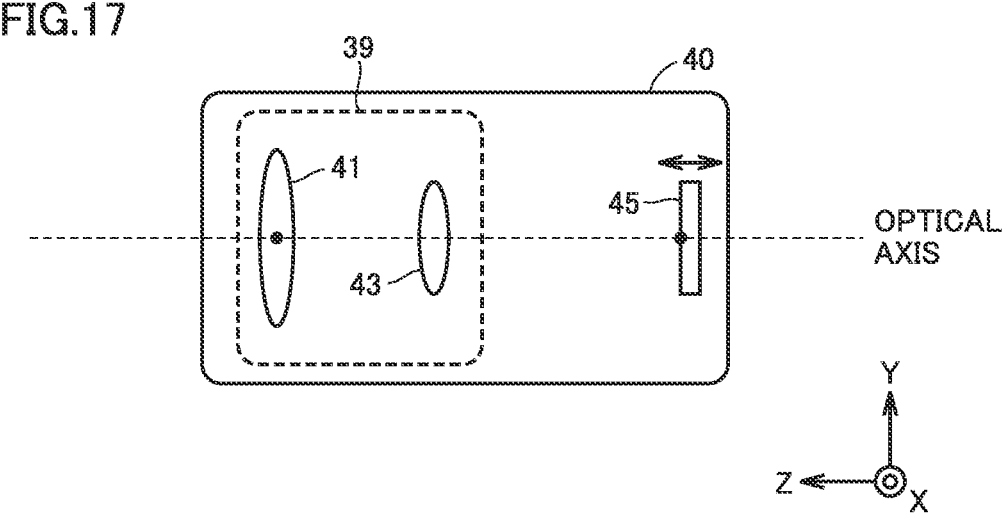
FIG. 17 schematically illustrates a driving mode with a tenth drive system.

With reference to FIG. 17, a tenth drive system is described. FIG. 17 schematically illustrates a driving mode with the tenth drive system.

In the above-described fifth and sixth drive systems, image sensor 45 is driven in the X direction. Unlike this, in the tenth drive system, image sensor 45 is driven in the Z direction, which is the optical-axis direction.

Image sensor 45 is driven by the above-described driver 47 (see FIG. 2). By way of example, driver 47 is a motor, a plunger, a piezoelectric element, or a combination thereof. Driver 47 drives image sensor 45 along the optical axis while maintaining the state in which the light receiving surface of image sensor 45 is orthogonal to the optical axis of lenses 41, 43. While reciprocatively driving image sensor 45 on the optical axis, optical measuring device 100 successively images a measuring object. Thus, the image formation position shifts frontward and backward on the optical axis. This allows optical measuring device 100 to generate a plurality of output images with their focal points slightly shifted from one another.

[Control Structure of Optical Measuring Device 100]

Figure 18:
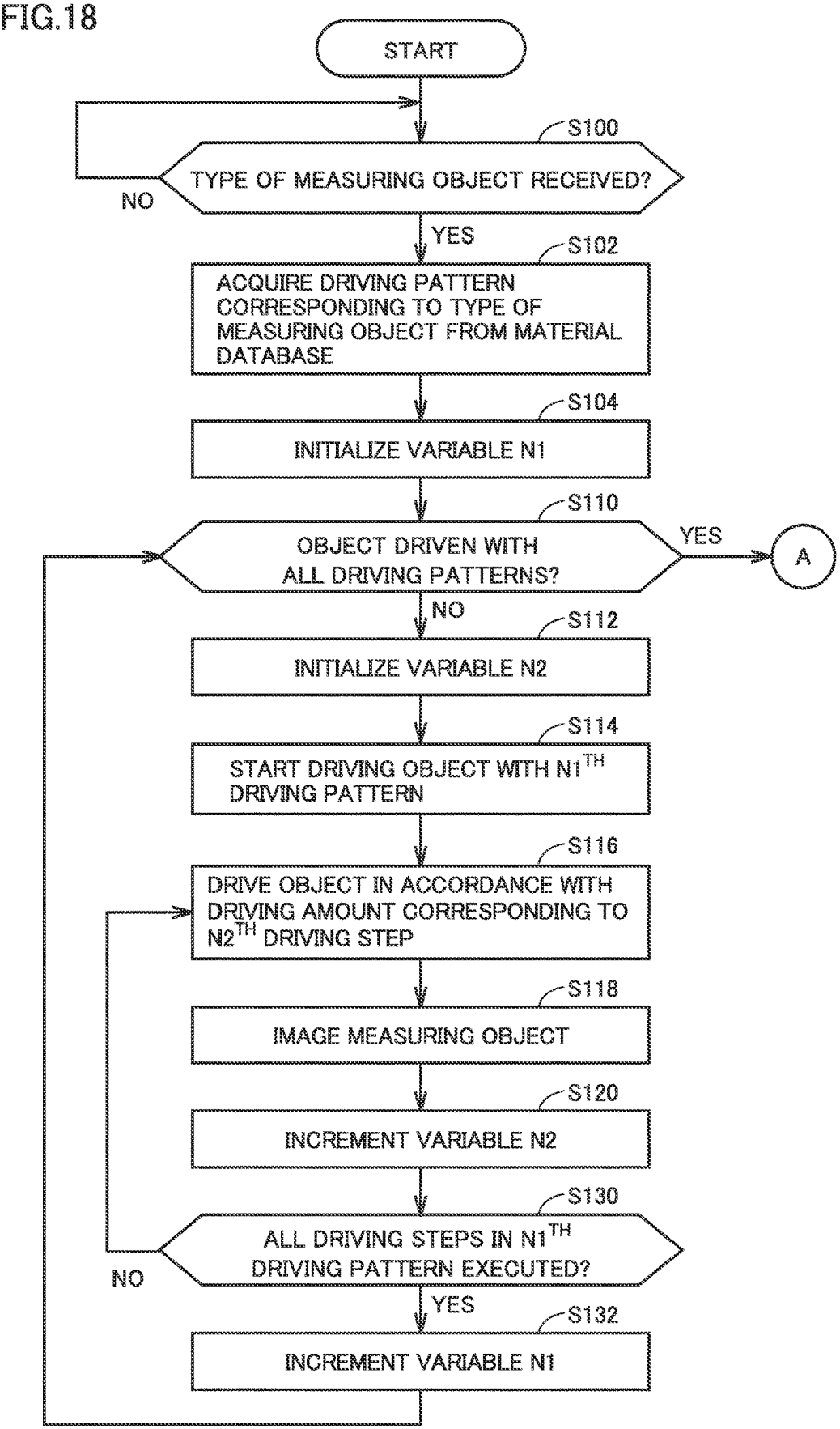
FIG. 18 is a flowchart illustrating a process for generating output images.
Figure 19:
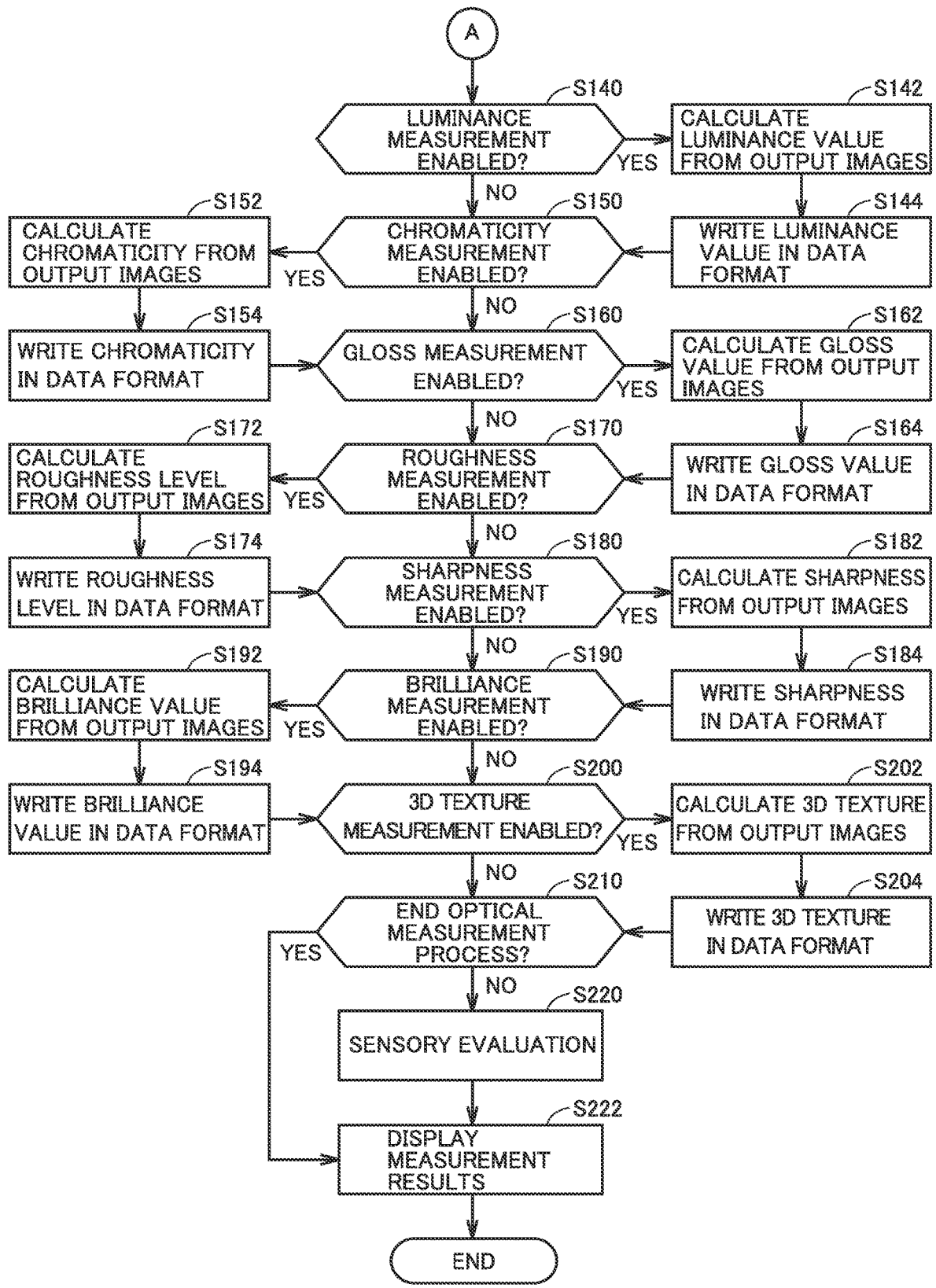
FIG. 19 is a flowchart illustrating a process for calculating optical measurement values of a measuring object.

With reference to FIG. 18 to FIG. 21, a control structure of optical measuring device 100 is described. FIG. 18 is a flowchart illustrating a process for generating output images. FIG. 19 is a flowchart illustrating a process for calculating optical measurement values of a measuring object. The processes in FIG. 18 and FIG. 19 are implemented by controller 101 (see FIG. 2) executing a program. In another aspect, the processes may be executed partially or wholly by a circuit element or other hardware.

In step S100, controller 101 determines whether or not a type of measuring object has been received. As a specific process, display 52 of optical measuring device 100 displays candidates for the type of measuring object. The displayed list of candidates for the type of measuring object allows easy viewing of the candidates. A user selects a type of measuring object from among the candidates displayed on display 52 by touching display 52 or operating operation unit 53. If determining that a type of measuring object has been received (YES in step S100), controller 101 switches the control to step S102. Otherwise (NO in step S100), controller 101 executes the process in step S100 again.

In step S102, controller 101 acquires a driving pattern corresponding to the type of measuring object. The driving pattern is acquired from a material database 110 shown in FIG. 20, for example. FIG. 20 illustrates example material database 110. As shown in FIG. 20, in material database 110, a driving pattern for a drive object is associated with each material type. Material database 110 may also include the results of evaluation of the sensory value for each material. The results of evaluation have been obtained beforehand through evaluation made by a person. Examples of the types of the sensory value to be evaluated include a moist texture, smoothness, glossiness, or a combination thereof. Material database 110 may also include optical measurement results, calculation expressions for calculating the sensory value from the optical measurement value, or correlation functions calculated from the correlation between the optical measurement value and the sensory evaluation for each material.

In one aspect, material database 110 is stored in optical measuring device 100. In this case, controller 101 acquires material database 110 from optical measuring device 100. Controller 101 acquires a driving pattern corresponding to the type of measuring object from among a plurality of driving patterns defined in material database 110. Controller 101 determines the specified driving pattern to be the driving pattern for the drive object.

In another aspect, material database 110 is stored in an external device, such as a server 150 (See FIG. 22) or PC 200 (see FIG. 2). In this case, optical measuring device 100 sends, to server 150, a request (hereinafter also referred to as an "acquisition request") for acquiring a driving pattern corresponding to the type of measuring object from among a plurality of driving patterns stored in server 150, via communication interface 54 (see FIG. 2). In response to the acquisition request received from optical measuring device 100, server 150 specifies a driving pattern corresponding to the type of measuring object from among a plurality of driving patterns defined in material database 110 and sends the specified driving pattern to optical measuring device 100. Optical measuring device 100 receives, from server 150, the driving pattern corresponding to the type of measuring object as the driving pattern for the drive object, via communication interface 54.

In step S104, controller 101 initializes a variable N1 representing a driving pattern number. Variable N1 is initialized to be zero, for example. If a plurality of driving patterns are acquired in step S102, each of the plurality of driving patterns is uniquely identified by variable N1.

In step S110, controller 101 determines whether or not the drive object has been driven with all the driving patterns acquired in step S102. If determining that the drive object has been driven with all the driving patterns acquired in step S102 (YES in step S110), controller 101 switches the control to step S140. Otherwise (NO in step S110), controller 101 switches the control to step S112.

In step S112, controller 101 initializes a variable N2 representing a step number of each driving pattern. Variable N2 is initialized to be zero, for example. Each driving pattern includes a plurality of driving steps, and each driving step of each driving pattern is uniquely identified by variable N2. Each driving step is associated with the driving amount of the drive object. The driving amount of the drive object is indicated by, for example, the amount of movement in the X direction, the amount of movement in the Y direction, the amount of movement in the Z direction, the rotational angle around the X axis, the rotational angle around the Y axis, and the rotational angle around the Z axis. If lenses 41, 43 to be driven are configured as replaceable and one of lenses 41, 43 has been replaced with a new one, then optical measuring device 100 preferably corrects the driving amount defined for each driving step, in accordance with a new lens. Specifically, optical measuring device 100 receives data representing the optical characteristics of a new lens from server 150 (See FIG. 22) or the like, and, based on the data, corrects the driving amount defined for each driving step.

In step S114, controller 101 specifies the "N1$^{th}$" driving pattern identified by variable N1 from among the driving patterns acquired in step S102, and starts driving the drive object in accordance with the specified driving pattern.

In step S116, controller 101 drives the drive object in accordance with the driving amount corresponding to the "N2$^{th}$" driving step identified by variable N2.

In step S118, controller 101 images the measuring object. This generates one output image. That is, each time step S118 is executed, one output image is generated.

In step S120, controller 101 increments variable N2. Specifically, controller 101 increases variable N2 by "1".

In step S130, controller 101 determines whether or not all the driving steps in the "N1$^{th}$" driving pattern have been executed. By way of example, the determination is made based on whether or not variable N2 has reached number m of driving steps (see FIG. 21). If determining that all the driving steps in the "N1$^{th}$" driving pattern have been executed (YES in step S130), controller 101 switches the control to step S132. Otherwise (NO in step S130), controller 101 returns the control to step S116.

In step S132, controller 101 increments variable N1. Specifically, controller 101 increases variable N1 by "1".

In step S140, controller 101 determines whether or not the luminance measurement is enabled. If determining that the luminance measurement is enabled (YES in step S140), controller 101 switches the control to step S142. Otherwise (NO in step S140), controller 101 switches the control to step S150.

In step S142, controller 101 calculates the luminance of the measuring object from a plurality of output images obtained in the process in step S118. The luminance may be calculated in any method. By way of example, controller 101 calculates the luminance of the measuring object by averaging the pixel values of each output image. Preferably, controller 101 specifies an area of the measuring object in each output image by using an image processing technology, such as template matching, and calculates the average of the pixel values in the specified area, as the luminance of the measuring object.

In step S144, controller 101 writes the luminance value calculated in step S142, in a data format 112 shown in FIG. 21. FIG. 21 illustrates example data format 112. In addition to the luminance value, controller 101 preferably writes the following in data format 112: the data number for identifying the data; the name of material; the date and time when the measuring object is measured; the identification information for identifying the material type (e.g. the name of material database); the measurement items of optical measuring device 100; the identification information for identifying the driving pattern (e.g. the name of driving pattern); and the control data used for controlling the drive object.

In step S150, controller 101 determines whether or not the chromaticity measurement is enabled. If determining that the chromaticity measurement is enabled (YES in step S150), controller 101 switches the control to step S152. Otherwise (NO in step S150), controller 101 switches the control to step S160.

In step S152, controller 101 calculates the chromaticity of the measuring object from a plurality of output images obtained in the process in step S118. The chromaticity may be calculated if the output images are color images. The chromaticity may be calculated in any method. By way of example, each output image is composed of an R image representing the red component of the measuring object, a G image representing the green component of the measuring object, and a B image representing the blue component of the measuring object. Controller 101 calculates, as a chromaticity, the ratio among the value obtained by averaging the pixel values of the R images, the value obtained by averaging the pixel values of the G images, and the value obtained by averaging the pixel values of the B images.

In step S154, controller 101 writes the chromaticity calculated in step S152, in data format 112. In addition to the chromaticity, controller 101 preferably writes the following in data format 112: the measurement items of optical measuring device 100; the identification information for identifying the driving pattern (e.g. the name of driving pattern); and the control data used for controlling the drive object.

In step S160, controller 101 determines whether or not the gloss measurement is enabled. If determining that the gloss measurement is enabled (YES in step S160), controller 101 switches the control to step S162. Otherwise (NO in step S160), controller 101 switches the control to step S170.

In step S162, controller 101 calculates the gloss level of the measuring object from a plurality of output images obtained in the process in step S118. The gloss level may be calculated in any method. By way of example, controller 101 counts the pixels having a pixel value exceeding a predetermined value, for each output image, and averages the results of the count, thereby calculating the gloss level.

In step S164, controller 101 writes the gloss level calculated in step S162, in data format 112. In addition to the gloss level, controller 101 preferably writes the following in data format 112: the measurement items of optical measuring device 100; the identification information for identifying the driving pattern (e.g. the name of driving pattern); and the control data used for controlling the drive object.

In step S170, controller 101 determines whether or not the roughness measurement ("orange peel measurement") is enabled. If determining that the roughness measurement is enabled (YES in step S170), controller 101 switches the control to step S172. Otherwise (NO in step S170), controller 101 switches the control to step S180.

In step S172, controller 101 calculates the roughness level of the measuring object from a plurality of output images obtained in the process in step S118. The roughness level may be calculated in any method. By way of example, controller 101 calculates the roughness level of the measuring object from the output images obtained by imaging the measuring object from different directions. A higher roughness level leads to a larger variation in pixel value among the output images obtained by imaging from different directions. A lower roughness level leads to a smaller variation in pixel value among the output images obtained by imaging from different directions. By paying attention to this fact, controller 101 calculates the degree of variation in pixel value among the output images obtained by imaging from different directions, and calculates the roughness level of the measuring object based on the degree of variation. Preferably, the roughness level is calculated after the position of the measuring object in each output image is adjusted among the output images.

In step S174, controller 101 writes the roughness level calculated in step S172, in data format 112. In addition to the roughness level, controller 101 preferably writes the following in data format 112: the measurement items of optical measuring device 100; the identification information for identifying the driving pattern (e.g. the name of driving pattern); and the control data used for controlling the drive object.

In step S180, controller 101 determines whether or not the sharpness measurement is enabled. If determining that the sharpness measurement is enabled (YES in step S180), controller 101 switches the control to step S182. Otherwise (NO in step S180), controller 101 switches the control to step S190.

In step S182, controller 101 calculates the sharpness of the measuring object from a plurality of output images obtained in the process in step S118. The sharpness may be calculated in any method. By way of example, controller 101 calculates the degree of variation in pixel value among the output images obtained by imaging the measuring object with varying focal points. A larger degree of variation leads to a higher sharpness, whereas a smaller degree of variation leads to a lower sharpness. Preferably, the roughness level is calculated after the position of the measuring object in each output image is adjusted among the output images.

In step S184, controller 101 writes the sharpness calculated in step S182, in data format 112. In addition to the sharpness, controller 101 preferably writes the following in data format 112: the measurement items of optical measuring device 100; the identification information for identifying the driving pattern (e.g. the name of driving pattern); and the control data used for controlling the drive object.

In step S190, controller 101 determines whether or not the brilliance measurement is enabled. If determining that the brilliance measurement is enabled (YES in step S190), controller 101 switches the control to step S192. Otherwise (NO in step S190), controller 101 switches the control to step S200.

In step S192, controller 101 calculates the brilliance value of the measuring object from a plurality of output images obtained in the process in step S118. The brilliance value may be calculated in any method. By way of example, the brilliance is calculated based on the output images obtained by driving a drive object with the above-described drift pattern. The measuring object is imaged at intervals of 100 µm to 500 µm while the imaging surface of image sensor 45 is being driven with the drift pattern. As a result, a predetermined number (e.g. five) of output images are obtained. Controller 101 calculates the luminance (for example, the reflectance or the brightness) for each output image. Controller 101 calculates the brilliance value from the calculated luminance, based on a predetermined correlation between the brilliance value and the luminance.

In step S194, controller 101 writes the brilliance value calculated in step S192, in data format 112. In addition to the brilliance value, controller 101 preferably writes the following in data format 112: the measurement items of optical measuring device 100; the identification information for identifying the driving pattern (e.g. the name of driving pattern); and the control data used for controlling the drive object.

In step S200, controller 101 determines whether or not the 3D texture measurement is enabled. If determining that the 3D texture measurement is enabled (YES in step S200), controller 101 switches the control to step S202. Otherwise (NO in step S200), controller 101 switches the control to step S210.

In step S202, controller 101 generates the 3D texture of the measuring object from a plurality of output images obtained in the process in step S118. The 3D texture may be generated in any method. Controller 101 uses information on parallax among the output images obtained by imaging the measuring object from different visual points to generate a 3D image, as a 3D texture, representing the measuring object.

In step S204, controller 101 writes the 3D texture generated in step S202, in data format 112. In addition to the 3D texture, controller 101 writes the following in data format 112: the measurement items of optical measuring device 100; the identification information for identifying the driving pattern (e.g. the name of driving pattern); and the control data used for controlling the drive object.

In step S210, controller 101 determines whether to end the optical measurement process. If determining to end the optical measurement process (YES in step S210), controller 101 switches the control to step S222. Otherwise (NO in step S210), controller 101 switches the control to step S220.

In step S220, controller 101 performs the sensory evaluation of the measuring object based on the measurement results (e.g. the luminance) of the measuring object. The sensory evaluation is described in detail later.

In step S222, controller 101 causes display 52 of optical measuring device 100 to display the measurement results. By way of example, display 52 displays the luminance value calculated in step S142, the chromaticity calculated in step S152, the gloss value calculated in step S162, the roughness level calculated in step S172, the sharpness calculated in step S182, the brilliance value calculated in step S192, the 3D texture generated in step S202, the sensory value obtained in step S220, and the like.

[Sensory Evaluation]

Figure 22:
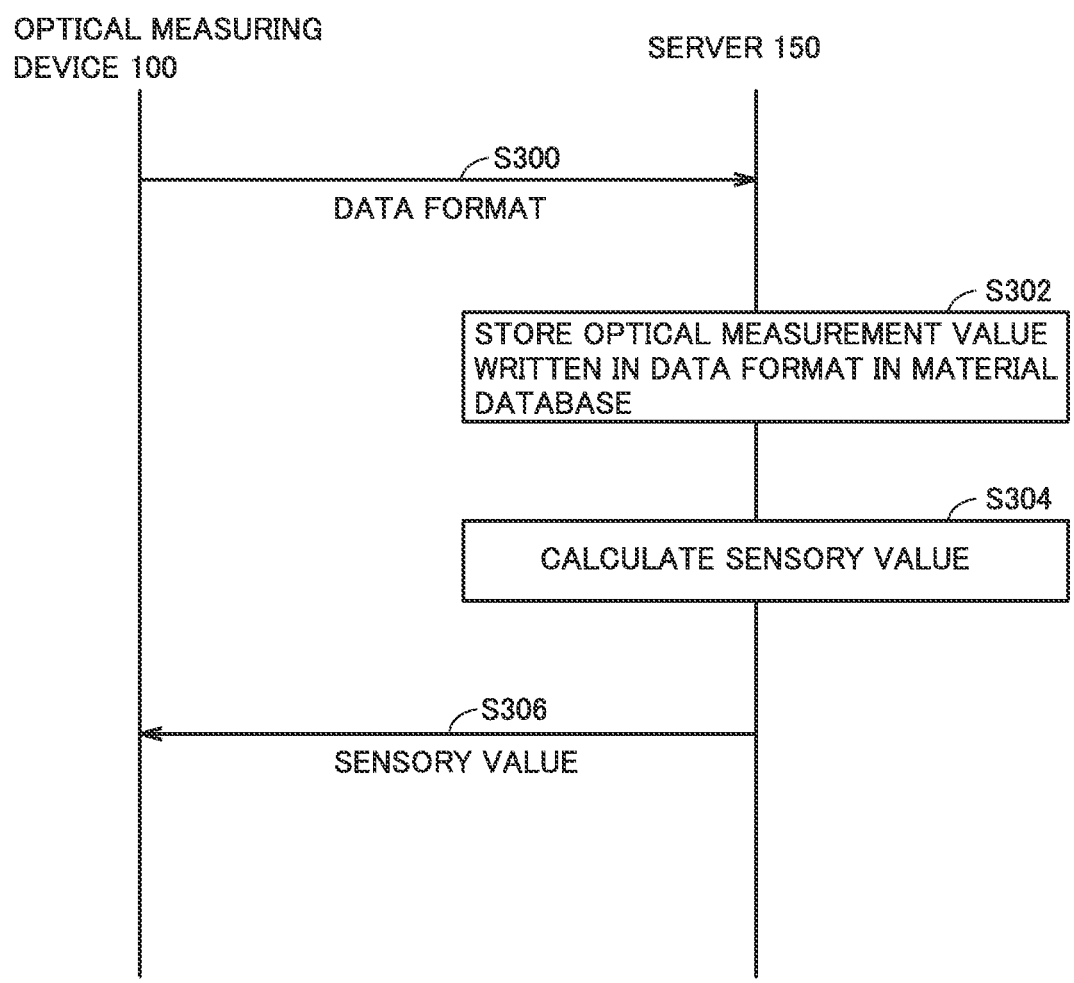
FIG. 22 is a sequence diagram illustrating a data flow between the optical measuring device and a server.

With reference to FIG. 22, the sensory evaluation in step S220 in FIG. 19 is described. The sensory evaluation may be performed by optical measuring device 100, or may be performed by server 150 or PC 200 (see FIG. 2) capable of communicating with optical measuring device 100.

The following describes a case in which the sensory evaluation is performed by server 150. FIG. 22 is a sequence diagram illustrating a data flow between optical measuring device 100 and server 150.

In step S300, optical measuring device 100 sends data format 112 to server 150. The communication between optical measuring device 100 and server 150 may be performed by wired communication or by wireless communication.

In step S302, server 150 writes, in material database 110 (See FIG. 20), the data in data format 112 received from optical measuring device 100.

In step S304, server 150 performs the sensory evaluation of the measuring object based on the optical measurement results included in data format 112. The sensory evaluation may be performed in any method.

An example method of the sensory evaluation is described. An evaluator gives a subjective sensory value to images for each material beforehand. Examples of the sensory value to be given include an evaluation value representing a texture, an evaluation value representing a moist texture, an evaluation value representing smoothness, and an evaluation value representing glossiness.

Figure 23:
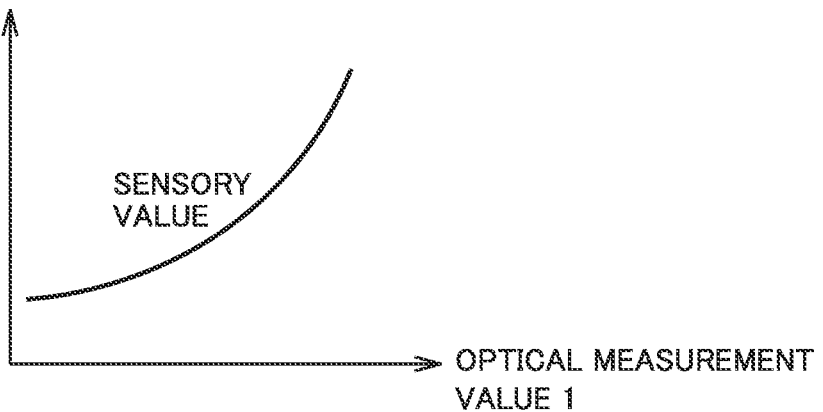
FIG. 23 illustrates an example correlation between the optical measurement value and the sensory value.

Server 150 then measures the optical measurement value for each image to which the sensory value has been given. Examples of the optical measurement value to be measured include a luminance value, a chromaticity, a gloss value, a roughness level, a sharpness, and a brilliance value. Server 150 calculates a correlation equation of the correlation between the sensory value that has been given and the optical measurement value that has been measured. FIG. 23 illustrates an example correlation between the optical measurement value and the sensory value. Server 150 associates the optical measurement value and the correlation equation with each other for each material type and stores them in material database 110. Such a process of learning the correlation equation is performed in advance before the sensory value of the measuring object is measured.

After that, server 150 acquires the correlation equation corresponding to the same type of material as the measuring object from among the correlation equations defined in material database 110, and acquires the optical measurement value from data format 112. Server 150 substitutes the optical measurement value acquired from data format 112 into the correlation equation acquired from material database 110, thereby calculating the sensory value of the measuring object.

In this way, server 150 learns the correlation between the optical measurement value and the sensory value beforehand, and calculates the sensory value of the measuring object based on the learned correlation and the optical measurement value measured for the measuring object. Preferably, the sensory value to be measured is selectable.

In step S306, server 150 sends the sensory value calculated in step S304 to optical measuring device 100.

Summary of Embodiment 1

As described above, optical measuring device 100 according to the present embodiment successively images a measuring object while reciprocatively driving a drive object (i.e., at least one of lenses 41, 43 and image sensor 45) in accordance with a predetermined driving pattern. This allows optical measuring device 100 to image the measuring object under various conditions.

By way of example, optical measuring device 100 can image a measuring object while shifting the focal point by moving the drive object on the optical axis. Optical measuring device 100 can also rotate the drive object around a predetermined point on the optical axis to image the measuring object from various directions. As a result, optical measuring device 100 can measure a change in surface reflectance and a degree of surface roughness of the measuring object, for example.

Second Embodiment

Figure 24:
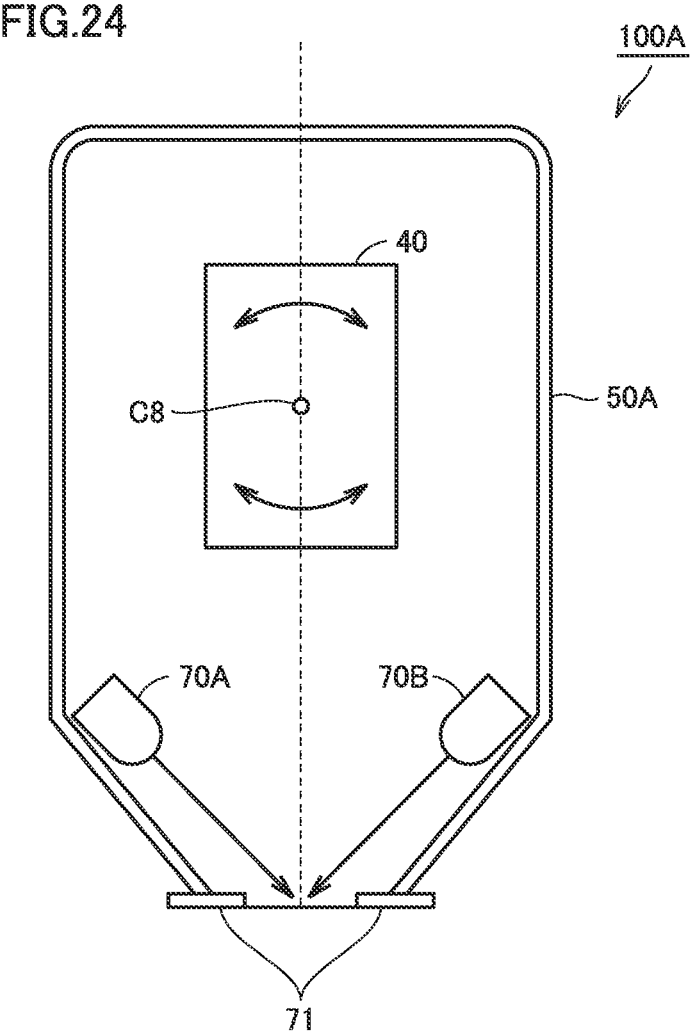
FIG. 24 illustrates an internal configuration of an optical measuring device according to a second embodiment.

With reference to FIG. 24, an optical measuring device 100A according to a second embodiment is described. FIG. 24 illustrates an internal configuration of optical measuring device 100A according to the second embodiment. Optical measuring device 100A according to the second embodiment is different from optical measuring device 100 according to the first embodiment in that optical measuring device 100A images a measuring object while optical measuring device 100A is in contact with the measuring object. In the other respects, optical measuring device 100A is the same as optical measuring device 100, and thus the explanation of the same features is not repeated hereinafter.

Optical measuring device 100A includes a housing 50A. In housing 50A, the above-described optical unit 40 and light sources 70A, 70B are provided. Light sources 70A, 70B illuminate a measuring object from different directions. Housing 50A has a stabilizing plate 71. Stabilizing plate 71 stabilizes optical measuring device 100A when a user brings optical measuring device 100A in contact with a measuring object.

Upon receiving an instruction for imaging a measuring object, optical measuring device 100A starts driving optical unit 40 in accordance with a predetermined driving pattern. By way of example, optical measuring device 100A repeats clockwise and counterclockwise rotations of optical unit 40 around point C8. As a result, a drive object in optical unit 40 is reciprocatively driven. Optical measuring device 100A successively images the measuring object while reciprocatively driving the drive object. This allows optical measuring device 100A to image the measuring object under various conditions.

Optical measuring device 100A measures various optical measurement values of the measuring object based on the output images obtained by imaging the measuring object. The following describes a case in which optical measuring device 100A measures a gloss level as an example of the optical measurement value.

If the measuring object is painted with metal or pearl and the paint contains different types or arrangements of brilliant materials (e.g. aluminum flakes and mica), then the measuring object looks differently depending on the direction of illumination light and the angle from which the measuring object is viewed. Therefore, the measuring object may look like different colors when painted in the same way.

Optical measuring device 100A compares the gloss level measured for a prepared standard sample and the gloss level measured for the measuring object with each other, and determines the quality of the measuring object. Specifically, optical measuring device 100A illuminates the standard sample from predetermined directions by using light sources 70A, 70B, and images the standard sample while reciprocatively driving optical unit 40. By reciprocatively driving optical unit 40, optical measuring device 100A allows optical unit 40 to make a simulated involuntary eye movement during fixation and thus can image the standard sample from various directions.

When the standard sample is imaged from different directions, the positions of pixels having a high luminance value are changed. The number of pixels having a high luminance value is also changed. Optical measuring device 100A counts, for each output image, the pixels having a pixel value higher than a predetermined value. Thus, optical measuring device 100A can determine the brightness (the gloss level) of the standard sample. Optical measuring device 100A calculates the difference or rate of change in the count value between the output images obtained by imaging the standard sample from adjacent angles. Optical measuring device 100A associates the difference or rate of change in the count value with the type of the standard sample, and stores these pieces of information in material database 110 (See FIG. 20).

Optical measuring device 100A calculates the difference or rate of change in the count value for the measuring object in response to receiving an instruction for measuring the measuring object. Optical measuring device 100A compares the difference or rate of change in the count value obtained for the measuring object with the difference or rate of change in the count value measured for the standard sample. Optical measuring device 100A determines the measuring object to be a better article as the difference or rate of change in the count value obtained for the measuring object is closer to the difference or rate of change in the count value measured for the standard sample. Since optical measuring device 100A evaluates the quality of the measuring object based on a change in size of a high-luminance area, optical measuring device 100A does not need to adjust the position of the measuring object among the output images.

<Summary>

An optical measuring device comprises: a lens to form an image with reflected light from a measuring object; an image sensor to receive the reflected light that has passed through the lens and generate an image representing the measuring object; a driver to drive a drive object, the drive object being at least one of the lens and the image sensor; and a controller to control the optical measuring device. The controller acquires, from the image sensor, a plurality of the images generated by the image sensor successively imaging the measuring object while the driver is driving the drive object in accordance with a predetermined driving pattern, and outputs the plurality of the images.

Preferably, the driver drives the drive object in a direction orthogonal to the optical axis of the lens.

Preferably, the driver drives the lens and the image sensor in opposite directions.

Preferably, the driver drives the lens and the image sensor in the same direction.

Preferably, the driver rotates the lens and the image sensor around a predetermined point on the optical axis of the lens.

Preferably, the driver drives the image sensor so that the light receiving surface of the image sensor inclines relative to the optical axis of the lens.

Preferably, the driver drives the image sensor along the optical axis of the lens while maintaining a state in which the light receiving surface of the image sensor is orthogonal to the optical axis.

Preferably, the controller selects two or more driving patterns, as the predetermined driving pattern, from among a plurality of the driving patterns different from one another.

Preferably, the plurality of the driving patterns include at least two of a first driving pattern, a second driving pattern, and a third driving pattern. The cycle of driving of the drive object with the first driving pattern is shorter than the cycle of driving of the drive object with the second driving pattern. The amplitude of driving of the drive object with the first driving pattern is lower than the amplitude of driving of the drive object with the second driving pattern. The amplitude of driving of the drive object with the first driving pattern is lower than the amplitude of driving of the drive object with the third driving pattern. The maximum value of the moving speed of the drive object with the first driving pattern is lower than the maximum value of the moving speed of the drive object with the third driving pattern.

Preferably, the plurality of the driving patterns are each associated with a type of object beforehand. The controller receives a type of the measuring object, and selects a driving pattern corresponding to the type of the measuring object, as the predetermined driving pattern, from among the plurality of the driving patterns.

Preferably, the optical measuring device further comprises a display to display candidates for the type of the measuring object. The controller receives the type of the measuring object from among the candidates displayed on the display.

Preferably, the optical measuring device further comprises a communication interface to communicate with a server. The server stores the driving pattern for each type of object. The communication interface sends, to the server, a request for acquiring a driving pattern corresponding to a type of the measuring object from among a plurality of the driving patterns stored in the server, and receives the driving pattern corresponding to the type of the measuring object, as the predetermined driving pattern, from the server that has received the request.

It should be construed that the embodiments disclosed herein are by way of example in every respect, not by way of limitation. The scope of the present disclosure is defined not by the above description but by the terms of the claims, and is intended to include any modification within the meaning and scope equivalent to the terms of the claims.

REFERENCE SIGNS LIST

35: measuring object; 40: optical unit; 41, 43: lens; 42, 44, 47: driver; 45: image sensor; 46: actuator; 48: converter circuit; 49: image processor; 50, 50A: housing; 51: optical system; 52: display; 53: operation unit; 54: communication interface; 55: power supply; 56: storage; 58: image generating program; 59: driving pattern; 60: board; 61A to 61C: piezoelectric element; 62: base member; 70A, 70B: light source; 71: stabilizing plate; 100, 100A: optical measuring device; 101: controller; 110: material database; 112: data format; 150: server; 200: PC; 300: eyeball; 301: crystalline lens; 302: retina; 311 to 313: graph

The invention claimed is:

1. An optical measuring device comprising:
a lens to form an image with reflected light from a measuring object;
an image sensor to receive the reflected light that has passed through the lens and generate an image representing the measuring object;
a driver to drive a drive object, the drive object being at least one of the lens and the image sensor; and
a controller to control the optical measuring device,
the controller acquiring, from the image sensor, a plurality of the images generated by the image sensor successively imaging the measuring object while the driver is driving the drive object in accordance with a predetermined driving pattern that changes the position of the drive object and the measuring object relative to each other for different ones of the plurality of the images, and outputting the plurality of the images with different measurement conditions,
wherein the predetermined driving pattern is one or more of a tremor pattern, a drift pattern, and a flick pattern.

2. The optical measuring device according to claim 1, wherein the driver drives the drive object in a direction orthogonal to an optical axis of the lens.

3. The optical measuring device according to claim 2, wherein the driver drives the lens and the image sensor in opposite directions.

4. The optical measuring device according to claim 2, wherein the driver drives the lens and the image sensor in the same direction.

5. The optical measuring device according to claim 1, wherein the driver rotates the lens and the image sensor around a predetermined point on an optical axis of the lens.

6. The optical measuring device according to claim 1, wherein the driver drives the image sensor so that a light receiving surface of the image sensor inclines relative to an optical axis of the lens.

7. The optical measuring device according to claim 1, wherein the driver drives the image sensor along an optical axis of the lens while maintaining a state in which a light receiving surface of the image sensor is orthogonal to the optical axis.

8. The optical measuring device according to claim 1, wherein the controller selects two or more driving patterns, as the predetermined driving pattern, from among a plurality of the driving patterns different from one another.

9. The optical measuring device according to claim 8, wherein
the plurality of the driving patterns include at least two of a first driving pattern, a second driving pattern, and a third driving pattern,
a cycle of driving of the drive object with the first driving pattern is shorter than a cycle of driving of the drive object with the second driving pattern,
an amplitude of driving of the drive object with the first driving pattern is lower than an amplitude of driving of the drive object with the second driving pattern,
the amplitude of driving of the drive object with the first driving pattern is lower than an amplitude of driving of the drive object with the third driving pattern, and
a maximum value of a moving speed of the drive object with the first driving pattern is lower than a maximum value of a moving speed of the drive object with the third driving pattern.

10. The optical measuring device according to claim 8, wherein the plurality of the driving patterns are each associated with a type of object beforehand, and the controller
receives a type of the measuring object, and
selects a driving pattern corresponding to the type of the measuring object, as the predetermined driving pattern, from among the plurality of the driving patterns.

11. The optical measuring device according to claim 10, further comprising a display to display candidates for the type of the measuring object, wherein
the controller receives the type of the measuring object from among the candidates displayed on the display.

12. An optical measuring device comprising:
a lens to form an image with reflected light from a measuring object;
an image sensor to receive the reflected light that has passed through the lens and generate an image representing the measuring object;
a driver to drive a drive object, the drive object being at least one of the lens and the image sensor;
a controller to control the optical measuring device,
the controller acquiring, from the image sensor, a plurality of the images generated by the image sensor successively imaging the measuring object while the driver is driving the drive object in accordance with a predetermined driving pattern that changes the position of the drive object and the measuring object relative to each other for different ones of the plurality of the images, and outputting the plurality of the images with different measurement conditions; and
a communication interface to communicate with a server, wherein
the server stores the driving pattern for each type of object, and
the communication interface
sends, to the server, a request for acquiring a driving pattern corresponding to a type of the measuring object from among a plurality of the driving patterns stored in the server, and
receives the driving pattern corresponding to the type of the measuring object, as the predetermined driving pattern, from the server that has received the request.

13. An image generating method with an imaging device, the imaging device comprising:
a lens to form an image with reflected light from a measuring object; and
an image sensor to receive the reflected light that has passed through the lens and generate an image representing the measuring object,
the image generating method comprising:
driving a drive object in accordance with a predetermined driving pattern, the drive object being at least one of the lens and the image sensor, wherein the predetermined driving pattern is one or more of a tremor pattern, a drift pattern, and a flick pattern;
causing the image sensor to successively image the measuring object while the drive object is being driven in accordance with the predetermined driving pattern, and acquiring a plurality of the images from the image sensor, wherein the predetermined driving pattern changes the position of the drive object and the measuring object relative to each other for different ones of the plurality of the images; and
outputting the plurality of the images with different measurement conditions.

14. A non-transitory computer readable recording medium storing an image generating program with an imaging device, the imaging device comprising:

a lens to form an image with reflected light from a measuring object; and an image sensor to receive the reflected light that has passed through the lens and generate an image representing the measuring object, the image generating program causing the imaging device to perform:

driving a drive object in accordance with a predetermined driving pattern, the drive object being at least one of the lens and the image sensor, wherein the predetermined driving pattern is one or more of a tremor pattern, a drift pattern, and a flick pattern;

causing the image sensor to successively image the measuring object while the drive object is being driven in accordance with the predetermined driving pattern, and acquiring a plurality of the images from the image sensor, wherein the predetermined driving pattern changes the position of the drive object and the measuring object relative to each other for different ones of the plurality of the images; and outputting the plurality of the images with different measurement conditions.

15. The optical measuring device according to claim 1, wherein the driver drives the drive object based on a type of the measuring object.

16. The image generating method according to claim 13, wherein the drive object is driven based on a type of the measuring object.

17. The image generating method according to claim 14, wherein the drive object is driven based on a type of the measuring object.

18. The optical measuring device according to claim 1, wherein the predetermined drive pattern is obtained based on a type of the measuring object.

19. The optical measuring device according to claim 13, wherein the predetermined drive pattern is obtained based on a type of the measuring object.

20. The optical measuring device according to claim 14, wherein the predetermined drive pattern is obtained based on a type of the measuring object.

* * * * *